(12) United States Patent
Gabelmann et al.

(10) Patent No.: US 7,151,466 B2
(45) Date of Patent: Dec. 19, 2006

(54) DATA-FUSION RECEIVER

(76) Inventors: Jeffrey M. Gabelmann, 245 Dresden Wood Dr., Boerne, TX (US) 78006; J. Stephen Kattner, 1441 W. Contour Dr. #112, San Antonio, TX (US) 78212; Robert A. Houston, 21939 Advantage Run, San Antonio, TX (US) 78258

( * ) Notice: Subject to any disclaimer, the term of this patent is extended or adjusted under 35 U.S.C. 154(b) by 289 days.

(21) Appl. No.: 10/922,630

(22) Filed: Aug. 20, 2004

(65) Prior Publication Data

US 2006/0041795 A1 Feb. 23, 2006

(51) Int. Cl.
*G01V 3/00* (2006.01)
(52) U.S. Cl. ............... 340/854.6; 343/893; 166/66; 702/17; 702/5
(58) Field of Classification Search ........... 340/854.6, 340/854.8; 166/66; 175/40; 343/719, 844, 343/893; 702/7, 17, 5
See application file for complete search history.

(56) References Cited

U.S. PATENT DOCUMENTS

| | | |
|---|---|---|
| 4,750,165 A | 6/1988 | Champagne et al. |
| 4,980,682 A | 12/1990 | Klein et al. |
| 5,157,605 A | 10/1992 | Chandler et al. |
| 5,189,414 A | 2/1993 | Tawara |
| 6,657,597 B1 | 12/2003 | Rodney et al. |

*Primary Examiner*—Albert K. Wong
(74) *Attorney, Agent, or Firm*—Charles W. Hanor, PC; Charles W. Hanor

(57) ABSTRACT

This invention is an ultra-low frequency electromagnetic telemetry receiver which fuses multiple input receive sources to synthesize a decodable message packet from a noise corrupted telemetry message string. Each block of telemetry data to be sent to the surface receiver from a borehole tool is digitally encoded into a data packet prior to transmission. The data packet is modulated onto the ULF EM carrier wave and transmitted from the borehole to the surface and then are simultaneously detected by multiple receive sensors disbursed within the rig environment. The receive sensors include, but are not limited to, electric field and magnetic field sensors. The spacing of the surface receive elements is such that noise generators are unequally coupled to each receive element due to proximity and/or noise generator type (i.e. electric or magnetic field generators). The receiver utilizes a suite of decision metrics to reconstruct the original, non noise-corrupted data packet from the observation matrix via the estimation of individual data frames. The receiver will continue this estimation process until: 1) the message validates, or 2) a preset "confidence threshold" is reached whereby frames within the observation matrix are no longer "trusted".

22 Claims, 15 Drawing Sheets

|  | Sensor 1 | Sensor 2 | Sensor 3 | Sensor 4 |
|---|---|---|---|---|
| State 1 | F1 Symbol | F1 Symbol | F1 Symbol | F1 Symbol |
| State 2 | F2 Symbol | F2 Symbol | F2 Symbol | F2 Symbol |
| ⋮ | ⋮ | ⋮ | ⋮ | ⋮ |
| State n | Fn Symbol | Fn Symbol | Fn Symbol | Fn Symbol |

Fig. 9

DATA-FUSION RECEIVER

STATEMENTS REGARDING FEDERALLY SPONSORED RESEARCH OR DEVELOPMENT

This invention was made in part with government support under Contract No. DE-FC26-02NT41656, awarded by the Department of Energy. The United States Government has certain rights in this invention.

CROSS-REFERENCE TO RELATED APPLICATIONS

Not applicable.

REFERENCE TO A MICROFICHE APPENDIX

Not applicable.

BACKGROUND OF THE INVENTION

1. Field of the Invention

This invention generally relates to the art of ultra-low frequency subterranean, electromagnetic telemetry, and more particularly, to a method and apparatus for recovering telemetry data packets in the presence of strong interfering ambient noise.

2. Description of the Related Art

Ultra-low frequency (ULF) electromagnetic (EM) waves are the preferred transmission mechanism for wireless subterranean telemetry applications due to the ULF wave's ability to propagate long distances through the earth's strata. In a typical subterranean telemetry application, the desired telemetry information is digitally encoded into data packets and sent as modulated "bursts" of ULF carrier waves. Transmission of the carrier waves is physically facilitated by injecting a modulated current into the earth media using a power amplifier to create a time-varying voltage potential between two transmit electrodes coupled to the earth media. The electrodes are spaced such that the induced current traverses a section of the earth media creating associated electric and magnetic field energy which radiates as time-varying wave fronts through the earth media.

Ultra-low frequency EM waves have the potential for traveling many thousands of feet through an earth media. The actual wave propagation distance is dependent upon several variables, the predominate variables being related to the geophysical characteristics of the earth strata imposed between the transmitter and a remote receiver. As with any communication system, the lossy nature of the transmission media will result in a degradation of power of the EM waves as they traverse the media. This loss of power is proportional to the distance traversed within the media; thus, the overall received signal strength can be greatly attenuated when it reaches a remotely located receive antenna.

The traveling EM waves are recovered at the receive end of the transmission link using a pair of receive electrodes which are spaced within the earth media so as to receive the incident voltage potential of the arriving EM wave fronts. Most commercial EM receivers employ some type of highly sensitive front-end amplifier, connected to the receive electrodes, to boost the strength of the received signal. However, even with the application of front-end amplification, the attenuation of the EM wave energy during traversal through an earth media can be so great that serious degradation of the signal-to-noise (SNR) ratio incident at the telemetry receiver will result. This SNR degradation is further compounded when the receive elements are located within an electrically noisy ambient environment, where both the arriving EM signal and the attendant surface noise receive equal amplification by the receiver front-end.

A common application area for ULF EM telemetry is borehole to surface communications, with the primary market relating to energy exploration and mining operations. Noise incident at the surface receiver is a major problem for borehole telemetry applications due to the harsh nature of the operational environment. This problem is compounded due to the fact that the wave-mechanics associated with downhole to surface EM wave propagation requires that the receive electrodes of the surface receiver be located proximal to the borehole and thus near the radiant noise sources located on or near the rig. A working rig creates a high energy, constantly changing ambient electrical noise environment due to the proximity of electric motors, switch and relay arcing, contact of dissimilar metals, the presence of high-voltage/current power conductors, etc. This ambient noise, in conjunction with the arriving, attenuated EM wave fronts, can cause severe degradation of the surface receiver SNR, making borehole telemetry operations unreliable, or in extreme cases, nonfunctional. The elevated noise environment presented by the rig makes the application of some form of receiver noise rejection mandatory for a practical realization of any type of commercially viable borehole telemetry system.

Borehole EM telemetry systems have been experimentally proposed and commercially produced for a number of years, with some of this work resulting in patents, the earliest found to date being in 1935 by J. H. Clark. Initial work in EM telemetry continued for a number of years, with several publications and patents coming from Daniel Silverman during the 1940's.

Most currently available ULF EM borehole telemetry systems utilize some form of noise rejection at the surface receiver in order to boost the receiver SNR and thus improve operational reliability and extend the telemetry depth capability. Early systems utilized hardware based electronic band-pass filters to discriminate against noise which lay outside the carrier frequency information bandwidth. Although adequate for discriminating against out-of-band noise (i.e. noise which resides at least one octave above or below the carrier frequency), hardware based filters provide little to no rejection for noise which is coincident at or near the carrier frequency.

Recent advances in microcomputer technology have allowed ULF EM receiver designers to employ increasingly sophisticated signal processing techniques to reject noise which is resident both in and out of the carrier information bandwidth. A common technique utilizes supplemental receive sensors to monitor the ambient noise environment. Noise data acquired by these noise sensors is processed by the receiver and used to alter the primary receive signal such that the noise within the primary signal is attenuated. There are several instances cited within the prior art where different variants of this type of multi-channel receiver topology is used to facilitate noise rejection for ULF bandwidth EM applications.

U.S. Pat. No. 4,750,156 describes a noise suppression method for application to seismic monitoring. Specifically, a separate noise receive detector is used to monitor the contaminating noise signal. The detected noise is processed by the receiver and used to generate a reference noise signal which is subsequently used to alter the original seismic signal such that the contaminating noise is minimized within the original signal.

U.S. Pat. Nos. 4,980,682, 5,189,414, and 6,657,597 describe various methods of reducing noise in borehole telemetry systems using multiple signal and noise sensors. Each of these methods utilizes a technique of simultaneously monitoring signal and noise at the receiver using multiple receive sensors. In each method cited, the information received from the noise sensors is utilized (using various signal processing techniques) to actively attenuate the noise from the original received signal.

U.S. Pat. No. 5,157,605 describes a method of combining multiple electromagnetic signals to facilitate improved reception during induction well logging. The technique described combines multiple receive signals using a weighted averaging scheme, in conjunction with multiple transmit frequencies, to improve the depth of investigation and vertical resolution of the induction logging measurement.

The examples cited from the prior art achieve noise rejection through direct alteration of the raw carrier signal waveform via spectral or temporal manipulation of incoming noise-waveform information gathered from supplemental signal sources. Signal processing techniques which require direct real-time combinatorial manipulation of the raw incoming data streams are computationally intensive. The computational burden is greatly increased when multiple sensor channels must be monitored and processed in real-time. An additional computational burden is placed on this type of multi-channel receiver in that the receiver must somehow decide which receive channels to process as "noise" channels and which to process as "signal" channels.

Finally, the cited prior art utilizes only the most basic information regarding the specific temporal or spectral noise content of the signal. No inference is made (or utilized) regarding the higher level information content of received telemetry signal metrics such as the specifics of the modulation scheme or the modulation protocol structure. The supplemental knowledge of such metrics can provide valuable information regarding the reconstruction of a noise corrupted message data packet.

Identification of Objects of the Invention. It is generally an object of the invention described herein to provide improved rejection of noise during the reception of ultra-low frequency EM telemetry data packets.

It is a specific object of the invention to provide an improved low-frequency EM telemetry receiver apparatus which fuses multiple receive-input sources to synthesize a decodable telemetry data packet.

It is a further object of the invention to provide a telemetry data packet synthesis method whereby a set of predetermined signal metrics are used to establish a "confidence" rating for each modulated frame of telemetry data being simultaneously received by multiple receive-input sources, whereby a single decodable telemetry data packet can be assembled using selected frames from all available receive-input sources.

BRIEF SUMMARY OF THE INVENTION

The objects identified above are incorporated into a new and improved ultra-low frequency electro-magnetic telemetry receiver which fuses multiple input receive sources to synthesize a decodable message packet from a noise corrupted telemetry message string. The application area includes, but is not limited to, usage for recovering borehole telemetry signals within an energy exploration related rig environment.

In a preferred embodiment of the invention, each block of telemetry data to be sent to the surface receiver from a borehole tool is digitally encoded into a data packet prior to transmission. Each data packet is constructed using discrete bits of information, hereafter referred to as frames. In the preferred modulation scheme, a frame represents the smallest significant piece of digital information to be encoded for transmission. Accordingly, the telemetry parameters which make up a data packet are represented using multiple digital words composed of individual data frames.

Once assembled, the data packet is modulated onto the ULF EM carrier wave and transmitted from the borehole to the surface. After traversing the earth media, the ULF EM waves that constitute the digital data packet arrive at the surface and are simultaneously detected by multiple receive sensors disbursed within the rig environment. In a preferred embodiment, the receive sensors include, but are not limited to, electric-field and magnetic-field sensors. As the EM wave-fronts approach the surface they are subject to corruption by the various noise sources originating from equipment on or near the rig. The spacing of the surface receive elements is such that these noise generators are unequally coupled to each receive element due to proximity and/or noise generator type (i.e. electric or magnetic field generators).

The surface receiver employs a unique multiple-input, time-domain synthesis, data-fusion methodology for the detection and reconstruction of the arriving data packet. As the EM wave-fronts arrive, the receiver fuses the incoming wave information, gathered from the multiple receive inputs, into a multi-sensor observation matrix. The receiver then utilizes a suite of decision metrics to reconstruct the original, non noise-corrupted data packet from the observation matrix via the estimation of individual data frames. In a preferred embodiment, the receiver utilizes temporal and magnitude related metrics, pertaining to the frame-specific modulation scheme, to identify minimally noise corrupted frames from among all possible simultaneously arriving frames. The identification process is based upon the assignment of a "confidence" rating to each frame contained within the observation matrix. The assignment of frame-based confidence ratings allows the receiver to estimate the "most likely" message by assembling a "virtual" message packet using the highest confidence-rated frame from each individual receiver sensor input being fused into the multi-sensor observation matrix. Once a virtual message is assembled, the receiver checks the estimation process result by attempting to validate the virtual message packet using an error detection mechanism which has been embedded into the message packet prior to transmission. In a preferred embodiment, this error mechanism would be a 16-bit cyclic redundancy code (CRC). If the virtual message packet fails to validate, the receiver will re-assemble the next "most likely" message using frames with increasingly lower confidence ratings. The receiver will continue this estimation process until: 1) the message validates, or 2) a preset "confidence threshold" is reached whereby frames within the observation matrix are no longer "trusted".

The data-fusion based estimation technique disclosed herein does not rely on the direct real-time combinatorial manipulation of the raw carrier signal waveforms nor does it require the receive algorithms to discriminate between "noise" or "signal" channels. The use of non-combinatorial algorithms which do not discriminate between the specific noise/signal characteristics of incoming receive channels provides a more robust and scalable noise rejection solution for ULF EM receive applications.

BRIEF DESCRIPTION OF THE SEVERAL VIEWS OF THE DRAWINGS

FIG. 9 is an idealized representation showing the structure of the multi-sensor observation matrix.

DETAILED DESCRIPTION OF THE INVENTION

The present invention provides an apparatus and means for recovering a subterranean ULF EM telemetry data packet in the presence of strong interfering non-stationary noise. The preferred embodiment of the invention described herein is presented within the context of an energy exploration based borehole transmission application; however, the same apparatus and techniques can be applied to any type of wireless low-frequency subterranean communications application which utilizes packetized data transmission techniques.

To convey a full understanding of the invention, it will be necessary to begin with a technical explanation of several fundamental items pertaining to the mechanics of subterranean telemetry. These items include: a description of the telemetry transmission pathway, the basics of multi-sensor noise coupling theory, and the format and construction of a telemetry data packet.

Figure 1:
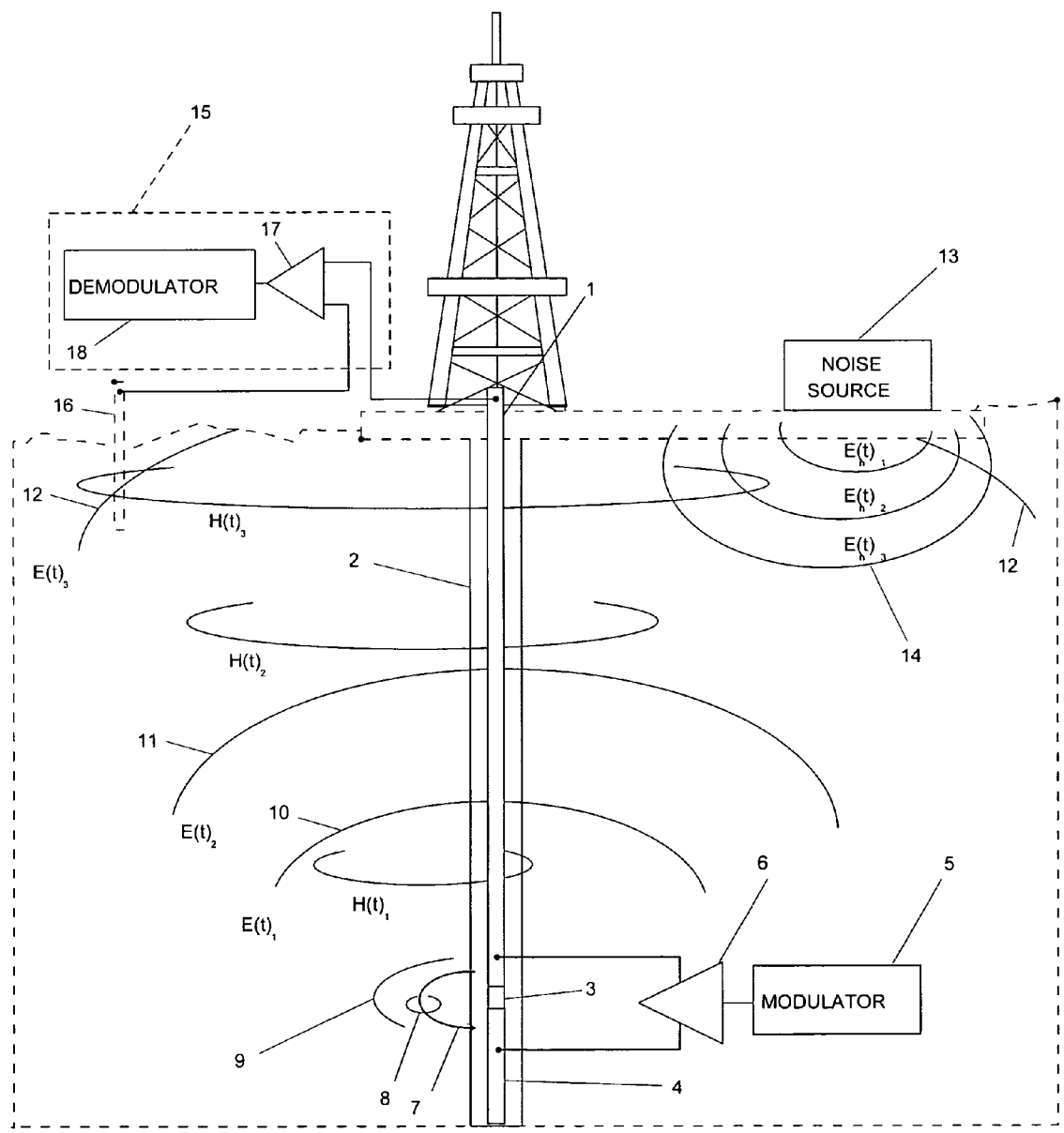
FIG. 1 is an illustration of a borehole telemetry system deployed within an energy exploration rig environment.

Telemetry Transmission Pathway. FIG. 1 shows a simplified illustration of a borehole telemetry system operating in an energy exploration related, rig-based environment. Referring to FIG. 1, drill string 1 is inserted in borehole 2 which is surrounded by an earth media. An insulating gap 3 is impressed upon the lower extremity of the drill string 1 such that an isolated electrode 4 is created. Proximal to the isolated electrode 4, a modulator 5 is used to drive a power amplifier 6 such that a time varying voltage potential, proportional to the modulator 5 output, is impressed across the insulating gap between the drill string 1 and the isolated electrode 4. Note that in a practical field application, the modulator 5 and power amplifier 6 would be contained in a pressure vessel integrated as an electronic sub-assembly within the drill string. This subassembly is commonly referred to as a downhole tool.

The time varying voltage potential impressed across the insulating gap 3 causes a time varying current i(t) 7 to be axially injected into the resistive earth media immediately surrounding the insulating gap 3. The time varying current i(t) 7 traversing the earth media creates a magnetic field H(t) within the media, represented in FIG. 1 by lines of force 8, and an associated orthogonal electric field E(t), represented by lines of force 9 as predicted by Maxwell's equations on electromagnetic field theory. The resulting electric and magnetic fields radiate through the earth media as propagating wave-fronts, depicted at times $t_1$, $t_2$, and $t_3$ in FIG. 1 by the graphic wave-front lines 10, 11, and 12. The traveling wave-fronts lose energy as they propagate through the earth media resulting in an attenuation of the overall signal strength of the modulated waveform. The amount of attenuation is primarily dependent upon the distance traveled through the media, the frequency of the transmission carrier waveform, and the conductivity of the media through which the wave is propagating.

As the attenuated E(t) and H(t) wave-fronts approach the earth surface, they are subject to destructive interference from the radiant emissions of high-power field generators resident at the surface. For purposes of illustrating the noise corruption mechanism, the following discussion will focus on the arriving electric field energy E(t); however, the same principles govern the magnetic field energy H(t). FIG. 1 depicts a single noise source 13 represented conceptually as an electric field generator. In a practical field application, the noise source 13 might be an electric motor, a contact interrupter style switch such as an SCR or relay, a high current 60 Hz power conductor, or any type of high energy electrical device which sources or sinks large amplitude, time-varying current. The noise source 13 is located at or near the rig and is producing electric field energy depicted in FIG. 1 as radiant wave-fronts $E_n(t)$ 14. The radiant noise energy $E_n(t)$ 14 mixes with the arriving E(t) wave-fronts causing amplitude and phase disruption of the original modulated carrier signal.

The resultant noise corrupted E(t) wave-fronts are sensed by surface receiver 15 as a voltage potential impressed between electrode 16 and the drill string 1. In a practical field application, the electrode 16 would be a 6' to 8' metal rod driven into the ground approximately 100' to 150' from the wellhead. The surface receiver 15 consists of a high-sensitivity amplifier 17 and a demodulator 18.

Figure 2:
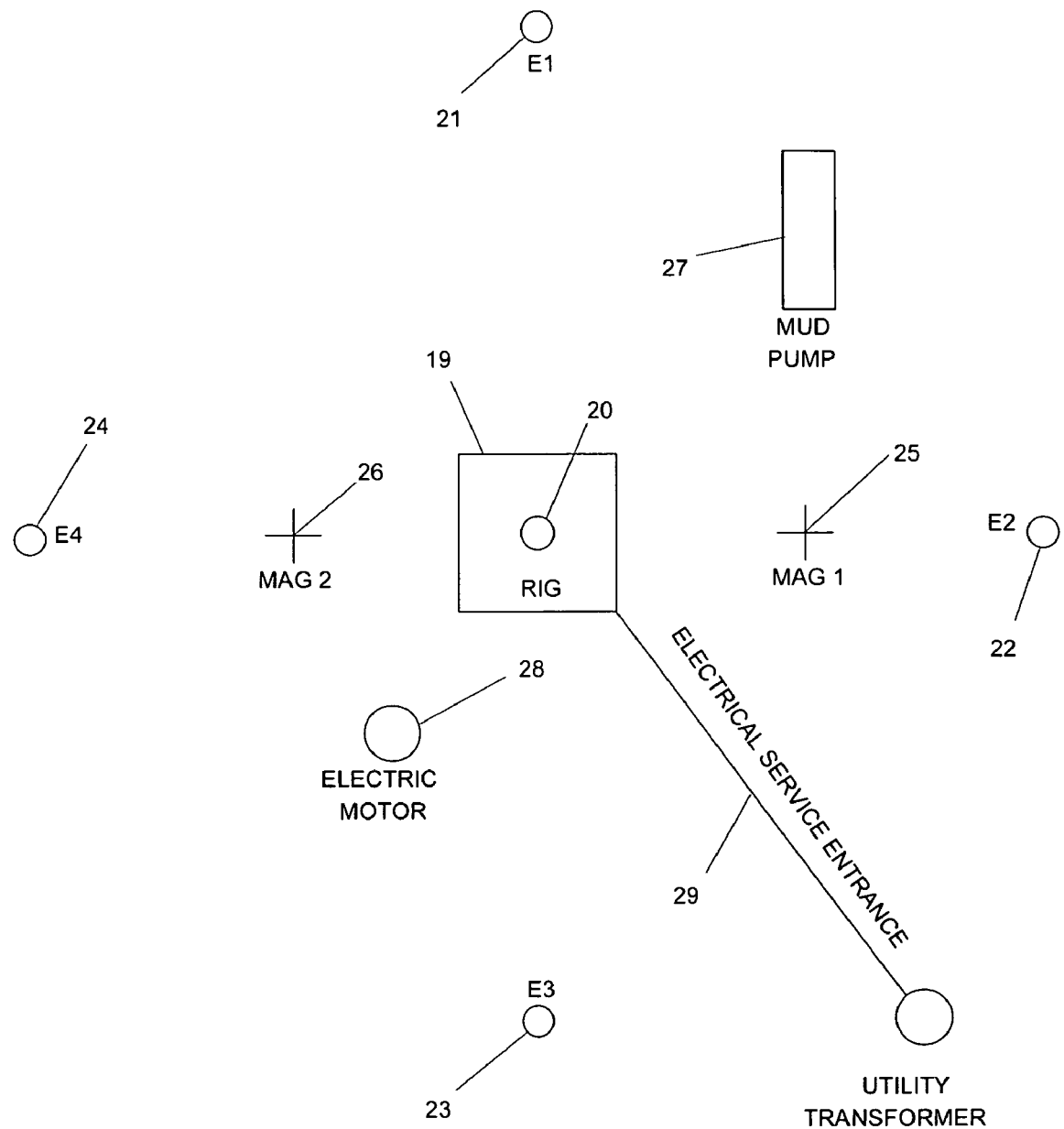
FIG. 2 depicts an overhead view of a typical rig site layout showing multiple receive elements deployed among various noise generators commonly found in a rig application environment.

Multi-sensor Noise Coupling. FIG. 2 shows a generic overhead layout view of a typical rig site. In the layout, a drilling rig 19 is shown located over a borehole 20, into which a drill string with a subterranean downhole tool containing a ULF EM transmitter is inserted. Multiple surface receive elements are shown deployed about rig 19 for purposes of receiving uplinked EM telemetry waveforms as they arrive from a transmitter located in the downhole tool. These receive elements include electric field receive electrodes $E_1$ 21, $E_2$ 22, $E_3$ 23, $E_4$ 24, and two 3-axis magnetometers $MAG_1$ 25 and $MAG_2$ 26 for magnetic field reception. The receive elements are shown spaced at equidistant points around the borehole 20.

As described in the previous section, the arriving E(t) and H(t) wave-fronts are subject to destructive interference resulting from interaction with the radiant emissions of any high-power field generators located at the surface. FIG. 2 depicts three different types of radiant noise generators which are commonly found on a rig site.

Referring to FIG. 2, a mud pump 27 is used to pump drilling mud from a mud tank to the drill rig. The mud pump might be powered by a gasoline engine which utilizes a high-voltage, spark-discharge type ignition. This type of ignition source will radiate a strong electric field interference component whose frequency will be dependent on the RPM speed of the engine/pump. An electric motor 28 is used to power a winch which is used on or near the rig to move drill pipe or other heavy objects. The windings of the electric motor produce a strong magnetic flux whose frequency content will be dependent on the revolutions-per-minute (RPM) speed and mechanical torque loading of the motor. An electric service entrance 29 is used to supply electric power to the rig. The service entrance is typically composed of a set of electric cables which conduct single phase or three-phase electric power to the rig. The service entrance radiates a strong 60 Hz (plus harmonics) magnetic flux and can also radiate non-periodic magnetic field disturbances due to spikes in the electric current demand of the rig. Additional surface noise radiators can include any metal-on-metal contact of pipe or machinery which can cause relatively large electric and magnetic field disturbances due to electron transfer (i.e. electric current flow) between the contacting dissimilar metals. This type of interference can exhibit either periodic behavior (e.g. a rotating drill pipe eccentrically contacting a bore collar) or a non-periodic, impulse function characteristic (e.g. a sliding drill pipe momentarily contacting a bore collar).

The physical deployment of the various types of peripheral rig equipment associated with radiant interference is site dependent and not subject to any type of standardized placement. In addition, the radiant emissions produced by each piece of equipment is not constant; the severity and periodicity of the emissions being dependent on the particular activity that is occurring on the rig at any given time. As such, the radiant field coupling of the interfering noise to the various receive elements is not consistent; therefore, each individual receive element will be subject to varying levels of interference at any specific moment in time.

The amount of noise coupling to each individual receive element is predominantly determined by:

The receive element's physical proximity to the noise source. Referring to FIG. 2 it is apparent that the electric field receive electrode $E_2$ 22 will receive larger quantities of radiant E-field emissions from mud pump 27 than the electric field receive electrode $E_4$ 24 because the $E_2$ 22 pickup is physically located closer to the mud pump 27.

The receive element type. Specific types of receive sensors will be affected by specific types of noise. For example, an electric field sensor functioning as a receive element will be relatively immune to a strong magnetic field noise emission source. The same is true for a magnetic field sensor exposed to a strong electric field radiator.

Telemetry Data Packet Construction. The telemetry data packet is the basic transport "package" which contains the information to be relayed from the tool to the surface receiver. Each data packet holds a data payload which provides a discrete "snapshot" of a specific process or set of processes being monitored by the downhole tool. This process data might include borehole temperatures and pressures associated with a downhole activity occurring proximal to the tool or responses to command queries received from the surface operator. During operation, the subterranean telemetry system will typically send multiple consecutive data packets to provide the surface operator with a continuous "view" of events happening in the borehole.

The process data is sampled by a microprocessor circuit, located within the downhole tool, and digitally encoded into binary words for placement within the data packet structure. The exact format of the data packet is determined by the communications protocol; however, most protocols have in common certain built-in features which allow the surface receiver to correctly identify and recover each individual data packet.

Once formatted, the data packet is modulated onto a carrier waveform for subsequent transmission to the surface receiver. The digitally-encoded nature of the data packet makes several modulation techniques possible. For purposes of teaching the art of the present invention, a phase-shift based modulation scheme will be adopted; however, it should be apparent to anyone skilled in the art that the data-fusion based signal recovery techniques described in this document can be readily applied to other common digital modulation schemes including: amplitude shift keyed (ASK) and frequency shift keyed (FSK).

A phase-based, digitally encoded transmit waveform is produced by altering the phase of a pure carrier signal as a function of a binary data stream. For example, a binary "1" would cause the phase of the carrier to be altered by 180° from the 0° phase (binary "0"). Such a 0° to 180° two-phase modulation scheme would represent two possible data states and is referred to as a Bi-Phase Shift Keyed (BPSK) phase modulation scheme. Accordingly, a Quadrature Phase Shift Keyed (QPSK) phase modulation scheme would encompass four possible phases (e.g. 0°, 90°, 180°, 270°), with each phase shift representing four possible data states; i.e., two bits of binary data (00, 01, 10, 11). These data states are commonly referred to in digital communications theory as symbols.

Figure 3:
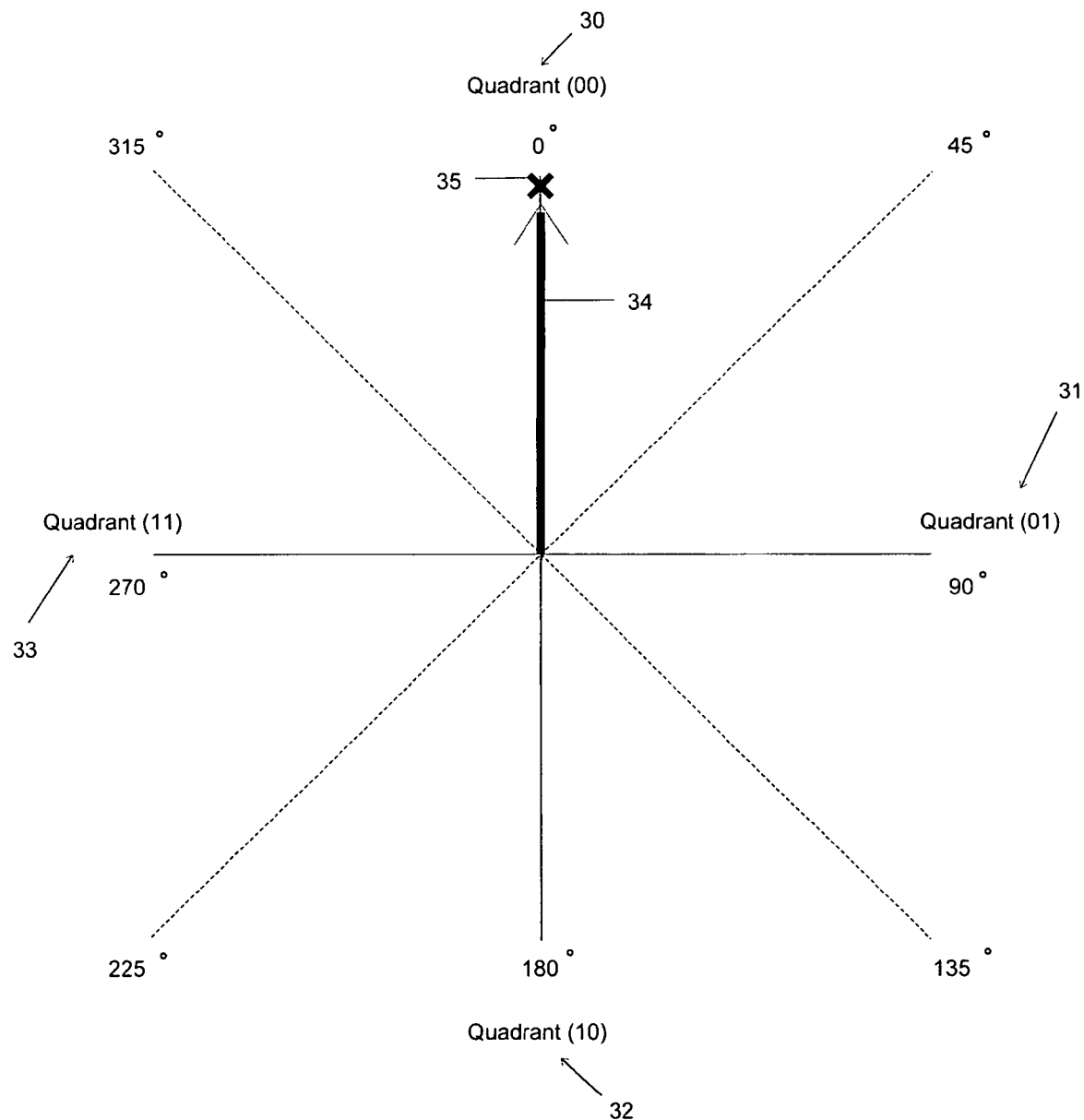
FIG. 3 is a phase diagram of an ideal quadrature phase shift keyed (QPSK) signal.

Phase modulated waveforms are commonly depicted in the teaching literature in graphical format in the form of a vector or grouping of vectors plotted on a phase diagram. FIG. 3 illustrates an ideal (i.e. noiseless) phase-domain representation of a single symbol of a QPSK modulated carrier. Note that the phase diagram is divided into four quadrants, with each quadrant representing a specific binary carrier state/symbol: quadrant [00] (referred to as #30 in FIG. 3), quadrant [01] (referred to as #31 in FIG. 3), quadrant [10] (referred to as #32 in FIG. 3), and quadrant [11] (referred to as #33 in FIG. 3). A vector 34 is shown which graphically represents the instantaneous state of an ideal carrier wave which has been modulated to represent the binary symbol 00. The length of vector 34 represents the instantaneous amplitude of the carrier wave and the angle of vector 34 represents the instantaneous phase. An "X" 35 is used to plot the location of the specific symbol represented by the phase modulated carrier.

Figure 4:
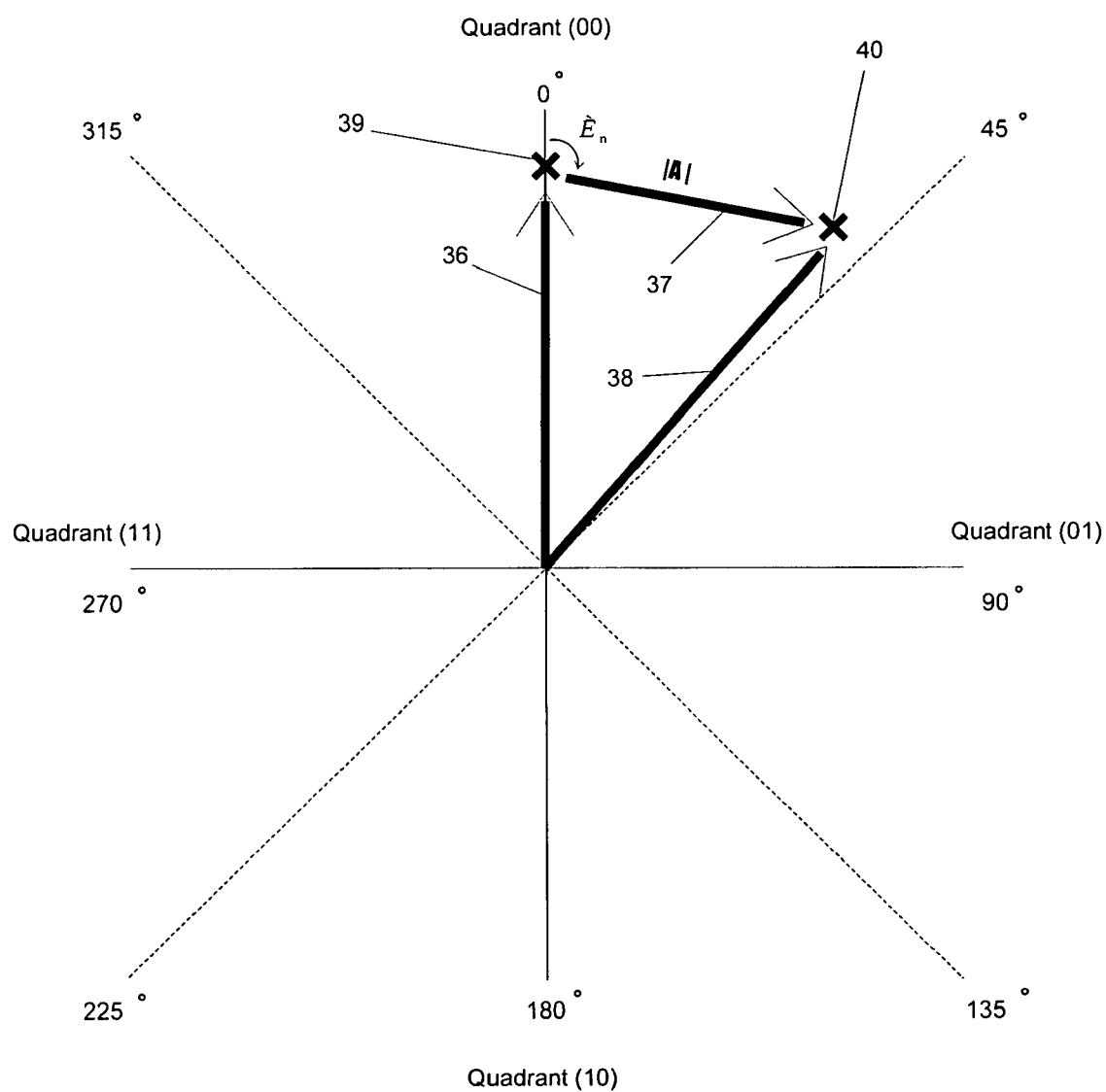
FIG. 4 is a phase diagram of a QPSK signal plus noise.

FIG. 4 shows the non-ideal phase-domain representation of the same QPSK modulated symbol as it would be affected by destructive noise interference encountered within the communication channel. A noise vector 37, having an instantaneous amplitude |A| and phase angle $\theta_n$, is shown acting on the ideal carrier wave vector 36. The noise vector 37 destructively interferes with the amplitude and phase of the ideal carrier vector 36 such that the resulting symbol is shifted from the ideal zero phase angle location 39, representing binary state 00, to a location 40 closer to the quadrant [00] symbol decision boundary. This new location is derived graphically, using simple vector addition, and is depicted in FIG. 4 as the noisy carrier vector 38. It can be seen from this example that, if the amplitude of the noise vector 37 is large enough, the resultant noisy carrier vector 38 could be pushed from the symbol quadrant [00] into the adjacent symbol quadrant [01], where it would be incorrectly decoded as a binary symbol 01 by the surface receiver.

The final telemetry data packet construction concept which should be understood is the concept of a data frame. A data frame is the smallest significant piece of modulated information contained within the telemetry data packet structural hierarchy. As such, each binary symbol of the QPSK modulated encoding scheme is represented as one frame of data; that is, each contiguous group of constant-phase carrier represents one frame of data. It is important to note that each symbol-vector depicted within a phase diagram represents an instantaneous temporal "snapshot" of one frame of data.

Figure 5:
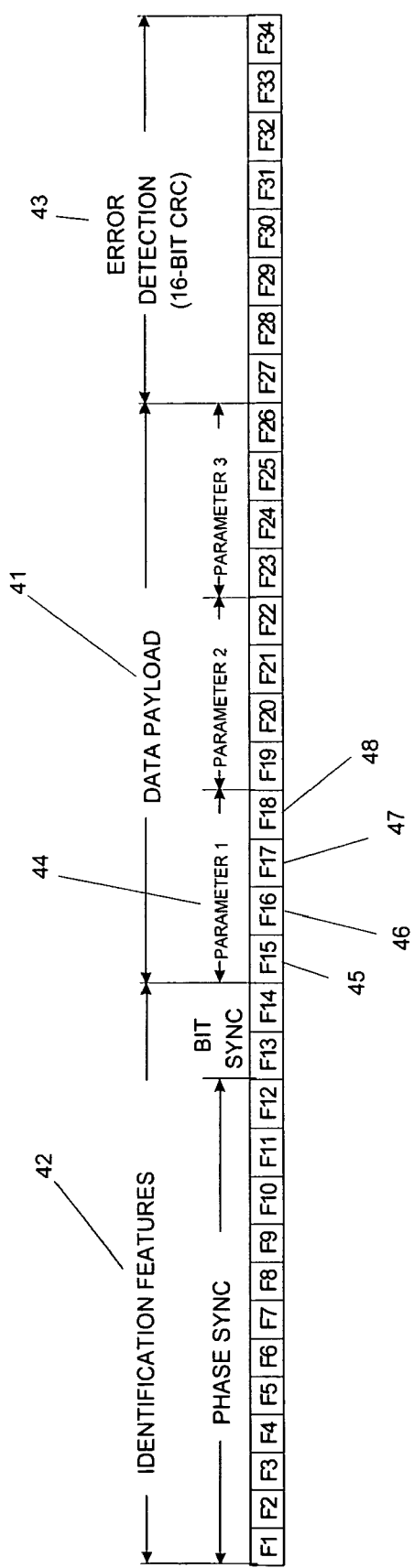
FIG. 5 shows a graphical representation of a typical telemetry data packet format.

FIG. 5 illustrates how data frames form the basic building-blocks of the data packet structural hierarchy. Referring to FIG. 5, the top level hierarchical structure of a data packet consists of three elements: the identification features 42, the data payload 41, and the error detection mechanism 43. The data payload 41 consists of the individual data parameters, with each data parameter being constructed of individual data frames. For example, parameter 1 (#44 in FIG. 5) is composed of four individual data frames F15, F16, F17, and F18 (#'s 45, 46, 47, and 48 respectively in FIG. 5). For purposes of illustration, we will arbitrarily assume that frames F15, F16, F17, and F18 all represent the binary 00 symbol.

Figure 6:
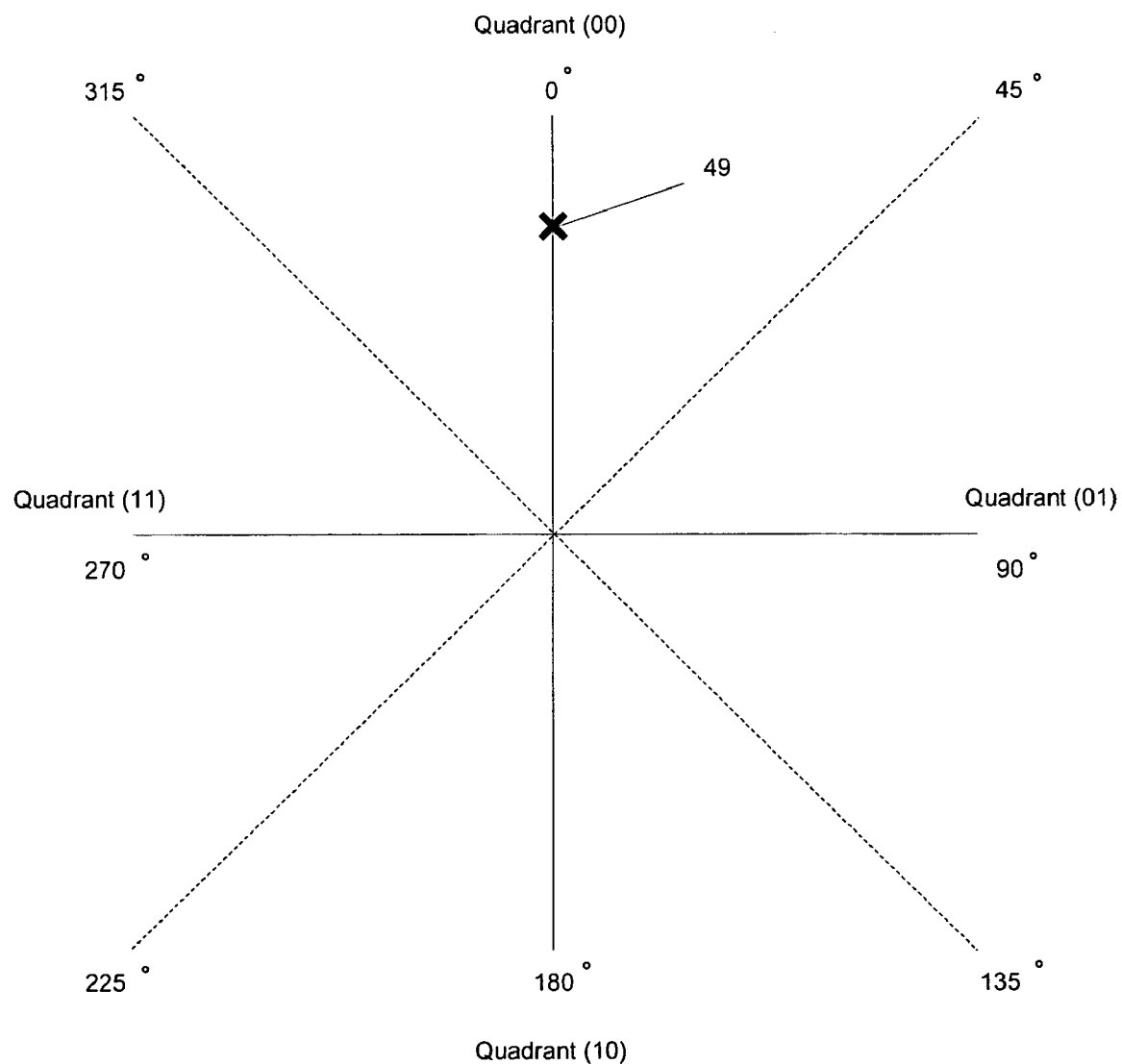
FIG. 6 shows an ideal phase diagram containing four frames representing a single data parameter within a data packet structure.

FIG. 6 shows the symbols for frames F15, F16, F17, and F18 plotted on a phase diagram as an ideal case; that is, with no interfering noise resident in the communication channel. Note that for the sake of clarity the actual symbol-vectors have been omitted and only the individual symbol locations are plotted. It can be seen from the FIG. 6 that, for the ideal noiseless case, all four symbols will plot exactly on top of each other as depicted in the figure by the single graphical symbol 49.

Figure 7:
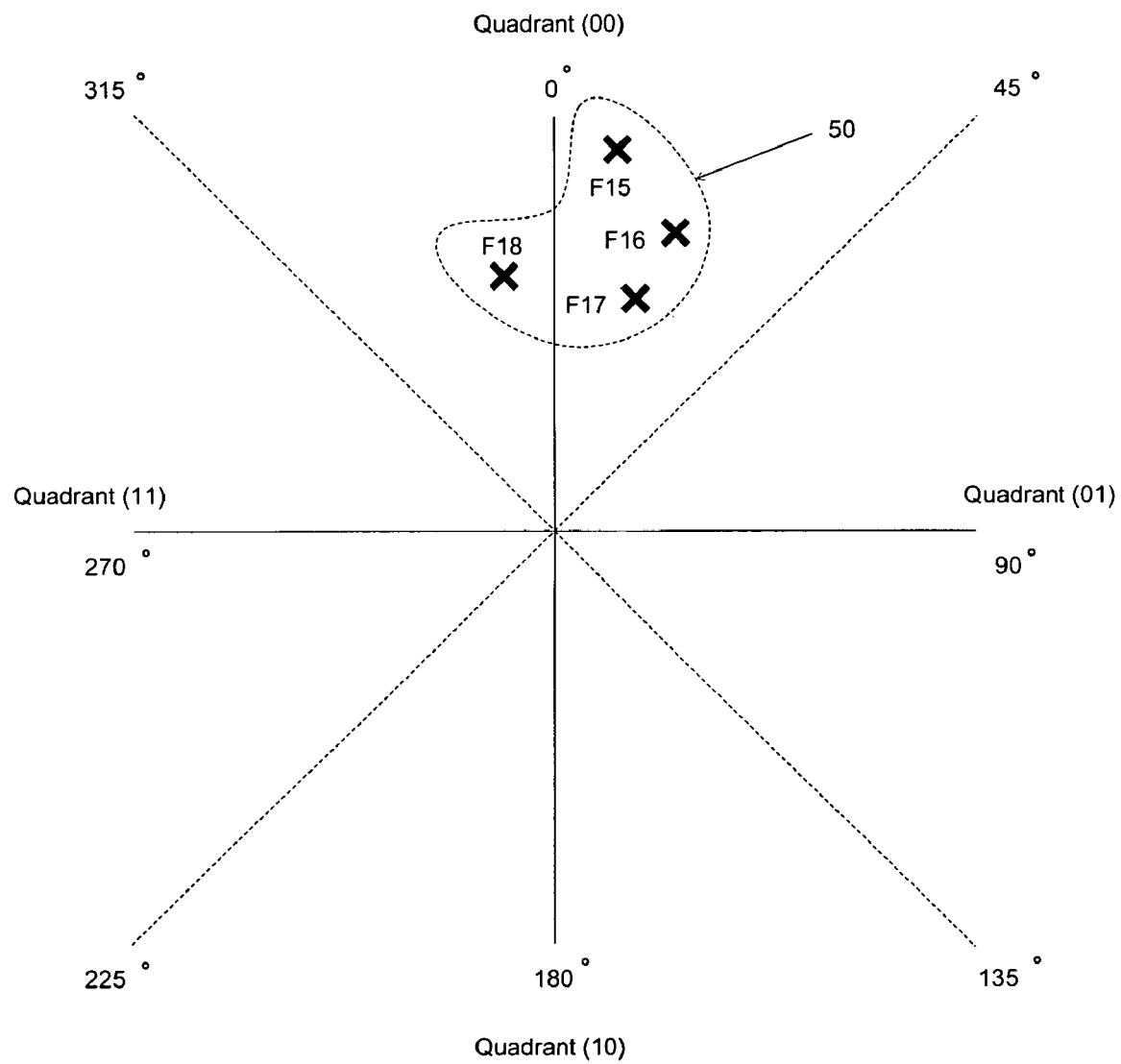
FIG. 7 shows a non-ideal phase diagram containing four noisy frames representing a single data parameter within a data packet structure.
Figure 8:
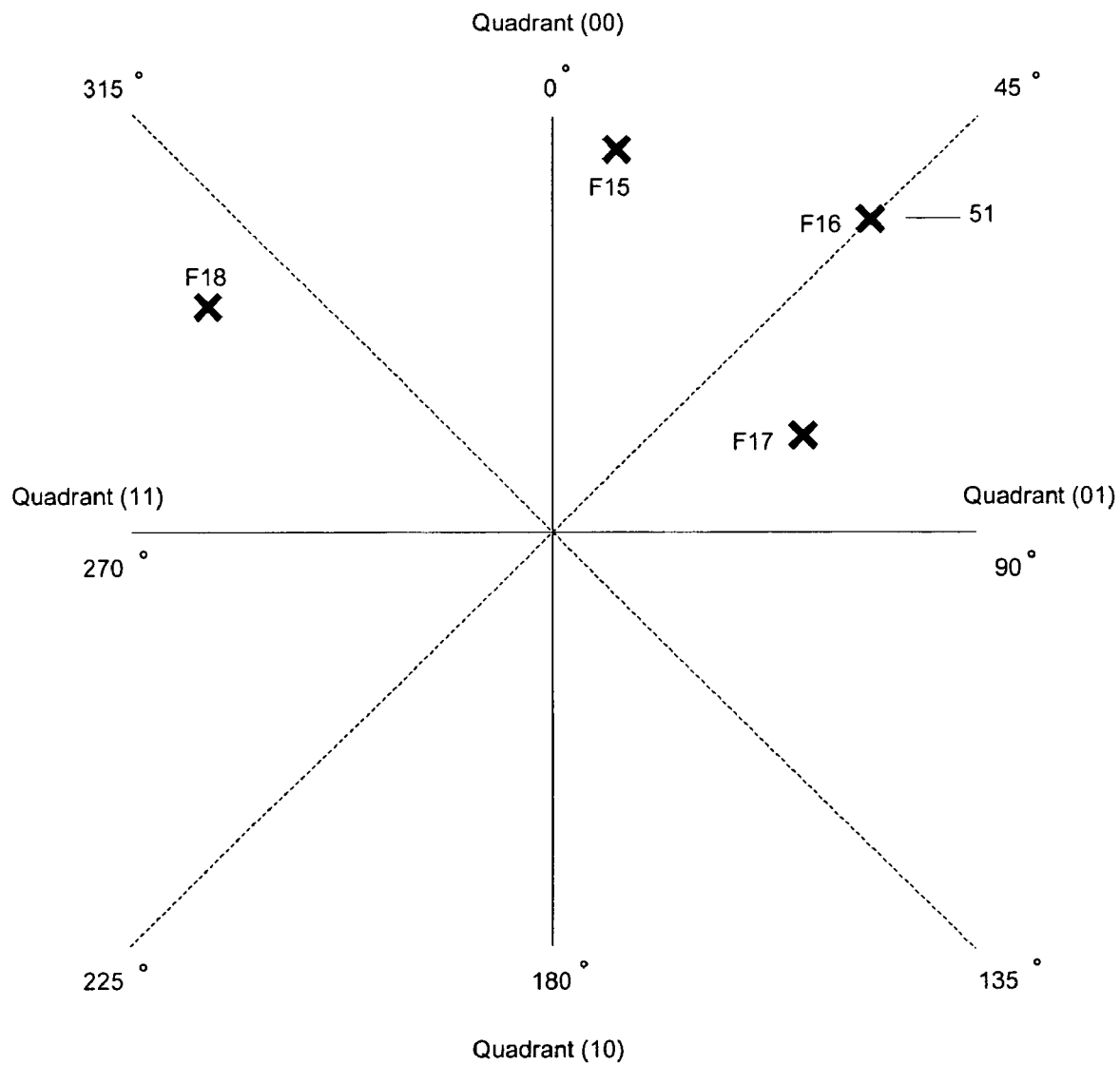
FIG. 8 shows a non-ideal phase diagram containing four extremely noisy frames representing a single data parameter within a data packet structure.

FIG. 7 illustrates what happens when a moderate amount of destructive noise is introduced into the communication channel of the previous example. The random interfering noise vectors cause the four symbols representing the four individual data frames to begin to spread. Note that although the four frames no longer plot concurrently on the ideal symbol location, the four symbols still form a definable group or "cluster" depicted by dotted line 50. FIG. 8 shows what happens as the severity of the destructive noise resident within the communications channel increases. In this case, the amplitude of the interfering noise vectors has become so great that some of the symbols are actually pushed into adjacent symbol decision quadrants, where they would be incorrectly decoded by the surface receiver. Symbol F16 (#51 in FIG. 8) is actually sitting on the 00 to 01 symbol decision boundary and as such could not be interpreted by the receiver.

Data-fusion Receiver. Drawing from the preceding explanation of the fundamental principles of subterranean telemetry, we can now proceed with a description of the unique aspects of the surface telemetry receiver invention.

The low-frequency EM telemetry receiver apparatus disclosed herein fuses multiple receive-input sources to facilitate the synthesis of a decodable telemetry data packet. The synthesis process is accomplished using a set of predetermined signal metrics to establish a "confidence" rating for each modulated frame of telemetry data being simultaneously received by the multiple receive-input sources whereby a single decodable telemetry data packet can be assembled using select frames from all available receive-input sources.

The receiver utilizes a software based algorithmic processing entity, hereafter referred to as a data-fusion engine, to make a decision about the "quality" of each frame of data that is simultaneously incident upon the multiple receive-sensors of the receive element group. Each frame acquired by the receive element group is stored as a set of symbols which represent one state within a multi-sensor observation matrix. The conceptual structure of the multi-sensor observation matrix is graphically represented in FIG. 9. Within the observation matrix, each row represents a set of symbols for one state/frame which have been simultaneously received by all the receive element sensors. Each column of the observation matrix represents sequential states/frames received by individual sensor elements of the receive element group. Therefore, each row of the observation matrix contains all the potential symbol values gathered for a single incoming frame of the arriving telemetry packet. Put another way, each row depicts a temporal state containing multiple representations of one frame of an arriving telemetry data packet.

The data-fusion engine makes a decision about which symbol value (taken from the set of possible symbols associated with each state) will be assigned to each incoming data frame for each new temporal state. The data-fusion engine employs a novel recursive estimation-algorithm which utilizes prior knowledge of specific metrics (i.e. state variables) of the previous states stored within the observation matrix. The symbol value derived by the estimator for the most recent incoming data frame is placed in a virtual-message symbol buffer. As subsequent frames arrive, the estimation process continues recursively until a data packet can be validated from the estimated symbol frames contained in the virtual-message symbol buffer. Data packet validation is accomplished using the error detection mechanism built into the data packet structure.

The estimation process is predicated on the examination of specific characteristics, or metrics, associated with each frame of data arriving simultaneously at each surface receive element. The estimator examines the arriving frame, acquired by each receive element, to determine which receive element has the highest probability of accurately representing the symbol for that state. It is important to understand that each "state" of the recursive estimation process is defined as a set of symbols which have been simultaneously recovered from multiple receive elements, and that each set of symbols represents the same frame of data acquired from the incoming data packet. It should be noted that each individual symbol within a set of symbols associated with a specific state of a multi-sensor observation matrix of a receive element group can be affected by interfering noise differently. As taught previously within this text, this difference is due largely to each receive element's proximity to the interfering noise source and/or the receive element's specific type.

The interfering noise acting on the individual receive elements will cause certain key characteristics of the frame to change. These characteristics can be quantified as specific metrics and tracked by the estimation-algorithm to help determine to what extent a particular symbol associated with a particular frame has been corrupted by noise. The tracking process is done recursively; that is, each time a new frame arrives, the metrics of all previous frames of each state of the observation matrix are re-examined in order to make a decision about the incoming frame and to re-evaluate the decisions made for previous frames. As new data is included in the observation matrix, (i.e. as subsequent data frames arrive), the accuracy of the estimation technique improves.

To illustrate the estimation technique, we will utilize a QPSK modulation scheme featuring metrics pertaining specifically to phase modulation based state-variables; that is, we will use the phase-domain as our state-space model for our recursive state estimation process. It will be apparent to anyone skilled in the art that the metric based estimation techniques described herein can be readily applied to other state-space models derived from common digital modulation schemes. For example, the frequency domain could be chosen as the state-space model for a frequency modulated FSK based scheme.

We will begin the explanation of the estimation technique using a simple graphical representation methodology illustrated through the use of phase diagrams. A mathematical rendering of the technique will be presented later in this discussion.

Figure 10:
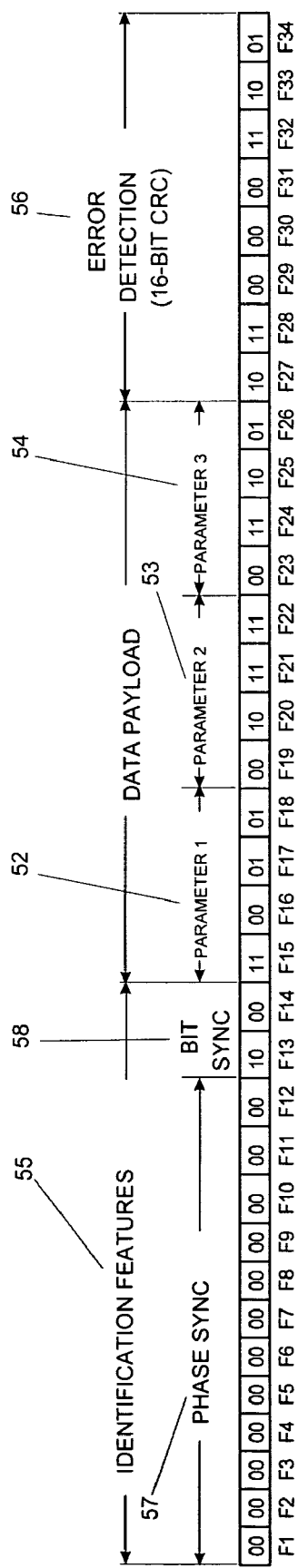
FIG. 10 shows the structure of a typical telemetry data packet.

Graphical Description of Estimation-Algorithm. FIG. 10 shows the structure of a typical telemetry data packet. The example packet depicted in FIG. 10 arbitrarily contains three data parameters (52, 53, and 54 in FIG. 10) along with generic identification features 55 and an error detection mechanism 56. The identification features 55 are of the type commonly used in conjunction with phase modulated carrier detection and do not merit further explanation other than to note that they consist of a series of twelve constant phase frames (Phase Sync 57) followed by two 180° alternating phase frames (Bit Sync 58). The frame symbol values for the three data parameters have been arbitrarily chosen and are shown in FIG. 10 along with an error detection mechanism 56 depicted as a 16-bit CRC.

Figure 11:
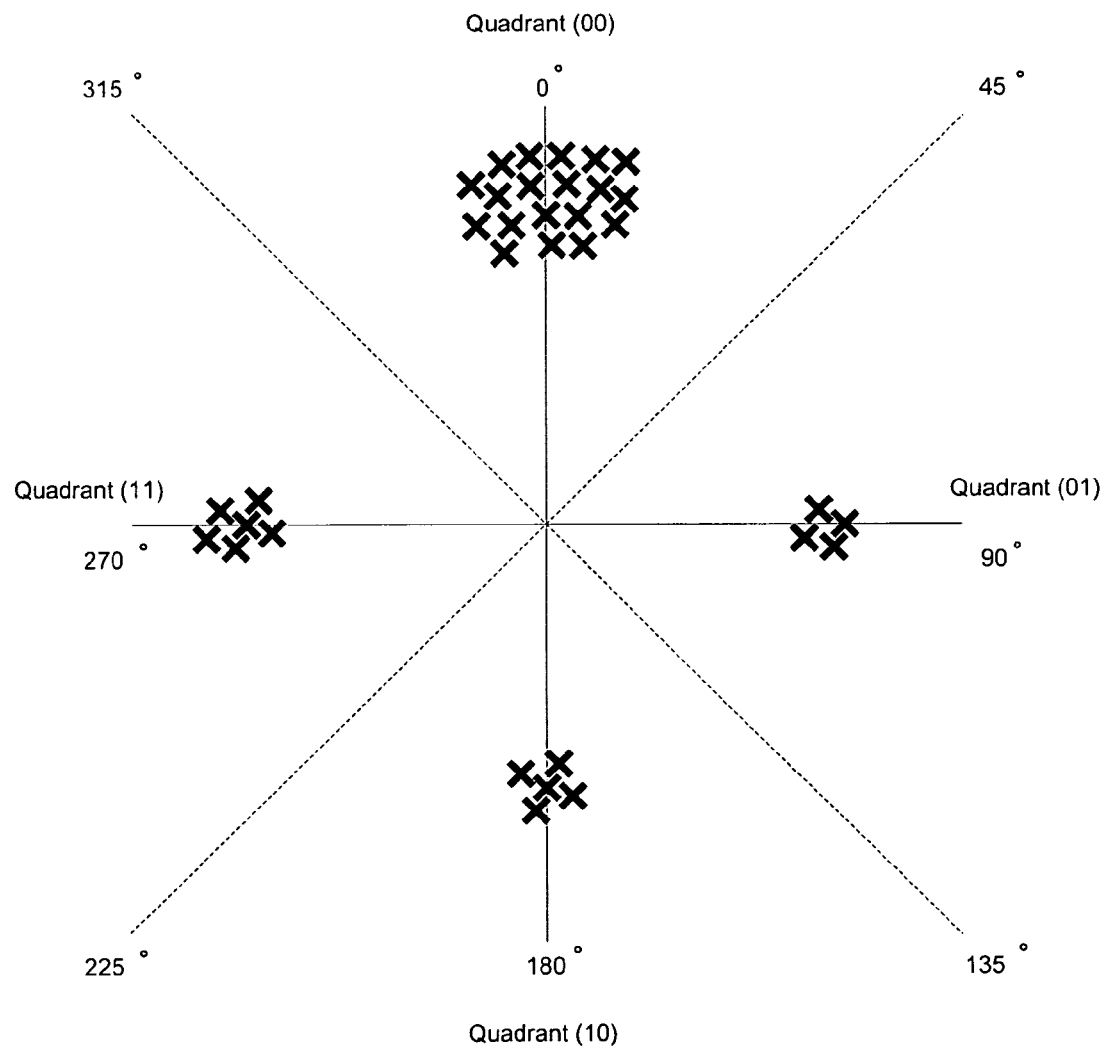
FIG. 11 is a phase diagram which shows the phase-domain mapping of all of the symbols contained within the example data packet shown in FIG. 10.

FIG. 11 shows all of the individual symbols (i.e. all of the temporal states) of the FIG. 10 example data packet mapped into the phase-domain state-space using a phase diagram. Note that FIG. 11 represents the multi-sensor observation matrix symbols acquired from only one receive element; that is, FIG. 11 graphically represents all of the states/frames associated with a telemetry data packet acquired by a single receive element of the receive element group. Put another way, the FIG. 11 phase diagram depicts one column of a multi-sensor observation matrix containing this example message packet (refer to FIG. 9 for clarity).

Note that the FIG. 11 symbols are tightly "clustered", indicating that this particular receive element was not being greatly effected by external noise sources during the reception of the message packet. The data-fusion estimation-algorithm would have a high probability of selecting frames from this receive element for use in assembling a decodable message packet assuming the estimation-algorithm utilized a cluster "tightness" metric to determine a "confidence" rating for selecting frames.

Figure 12:
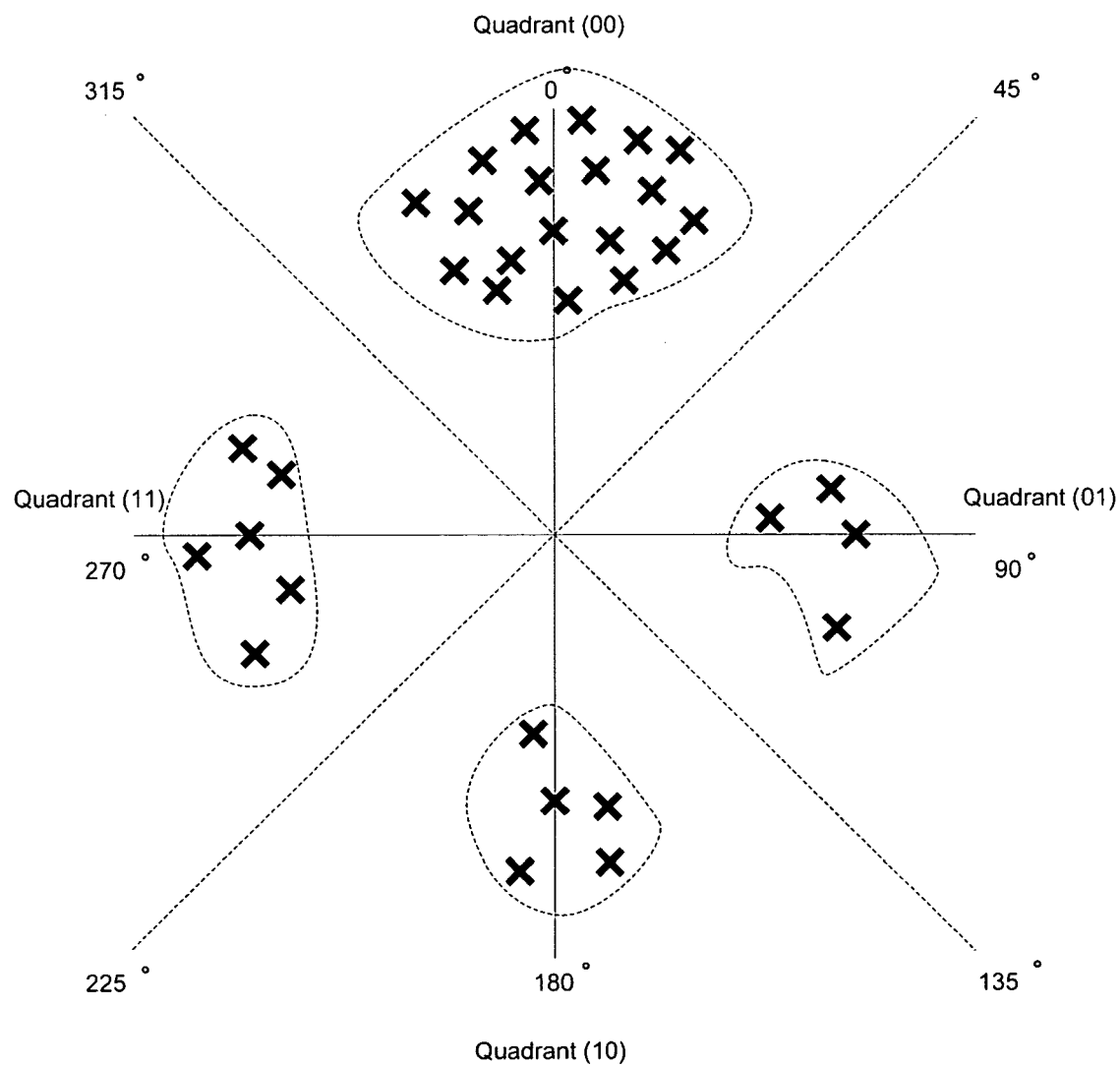
FIG. 12 is a phase diagram which shows the phase-domain mapping of all of the symbols contained within the example data packet shown in FIG. 10 plus a moderate amount of interfering noise.

FIG. 12 represents the phase-domain state-space mapping of the same FIG. 10 example message packet as it might be simultaneously received from a second receive sensor of the same receive element group. As with FIG. 11, the symbols mapped in FIG. 12 represent the multi-sensor observation matrix symbols acquired from only one receive element. It is apparent that the receive element depicted in FIG. 12 is being subjected to a higher level of external interfering noise, and thus the cluster "tightness" of the symbol groups is not as evident. It is less likely that the estimation-algorithm would select symbols from this receive element as compared to the symbols associated with the receive element depicted in FIG. 11.

Figure 13:
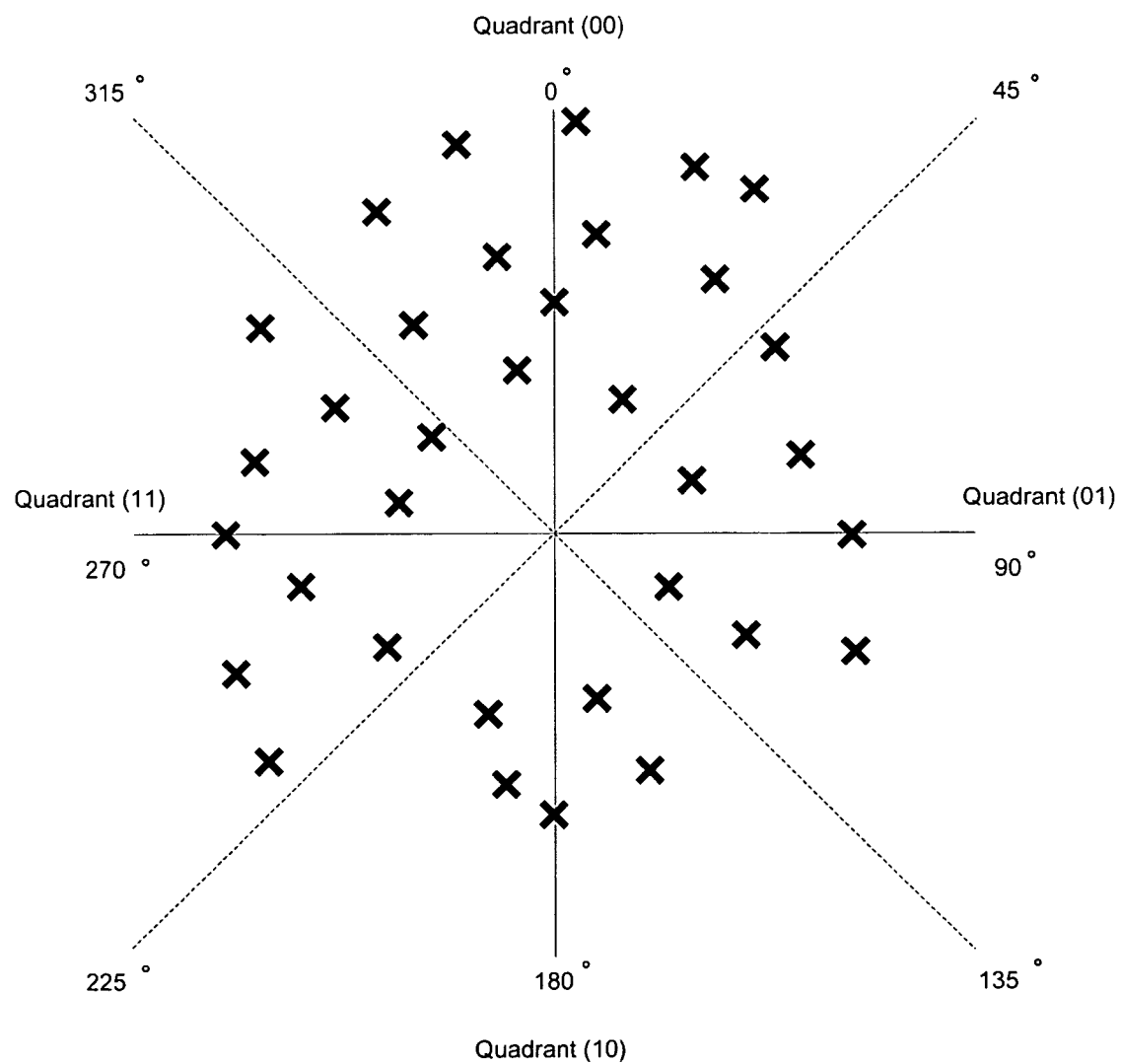
FIG. 13 is a phase diagram which shows the phase-domain mapping of all of the symbols contained within the example data packet shown in FIG. 10 plus a severe amount of interfering noise.

FIG. 13 represents the phase-domain state-space mapping of the same FIG. 10 example message packet as it might be simultaneously received from a third receive senor of the same receive element group. The mapped symbols of FIG. 13 exhibit no definable "clustering" due to extremely large amounts of interfering destructive noise. The estimation-algorithm would have an extremely low "confidence" level as to the validity of any symbols recovered from this receive element.

Detailed Derivation of Estimation-Algorithm. Certain desirable key-characteristics of an optimal estimation-algorithm framework are evident from the above simplified explanation of the operation of the preferred data-fusion engine estimator. These characteristics include:

Simultaneous processing of multiple input data channels—this includes the ability to compile and maintain a multi-sensor observation matrix in real-time without putting an undue computational burden on the processing hardware.

Conditional probability assessment of metric based decision criteria—the estimator should be capable of generating conditional probability density outputs including mean, mode, and median derivations. These statistical moments will be used to determine the optimal value of a desired metric (i.e. state variable) for any given estimator state. Specifically, these statistical moments will be used to establish a "confidence" rating for each incoming frame received from each sensor of the receive element group.

Recursive operation—requires that the estimation algorithm has the ability to propagate statistical calculations from previous states/iterations in order to make decisions about the current state and also to alter/modify decisions made concerning previous states. This capability will allow the estimation-framework to assemble a dynamically allocated virtual message buffer.

A preferred embodiment of the invention uses a modified Kalman filter to recover subterranean electromagnetic telemetry data packets that have been corrupted by noise. Note that the term filter is to be conceptualized as a processing algorithm not an electrical network. The Kalman filter meets all of the above listed optimal estimation-algorithm framework criteria and thus is the ideal basic building block for the data-fusion engine computational structure.

Figure 14:
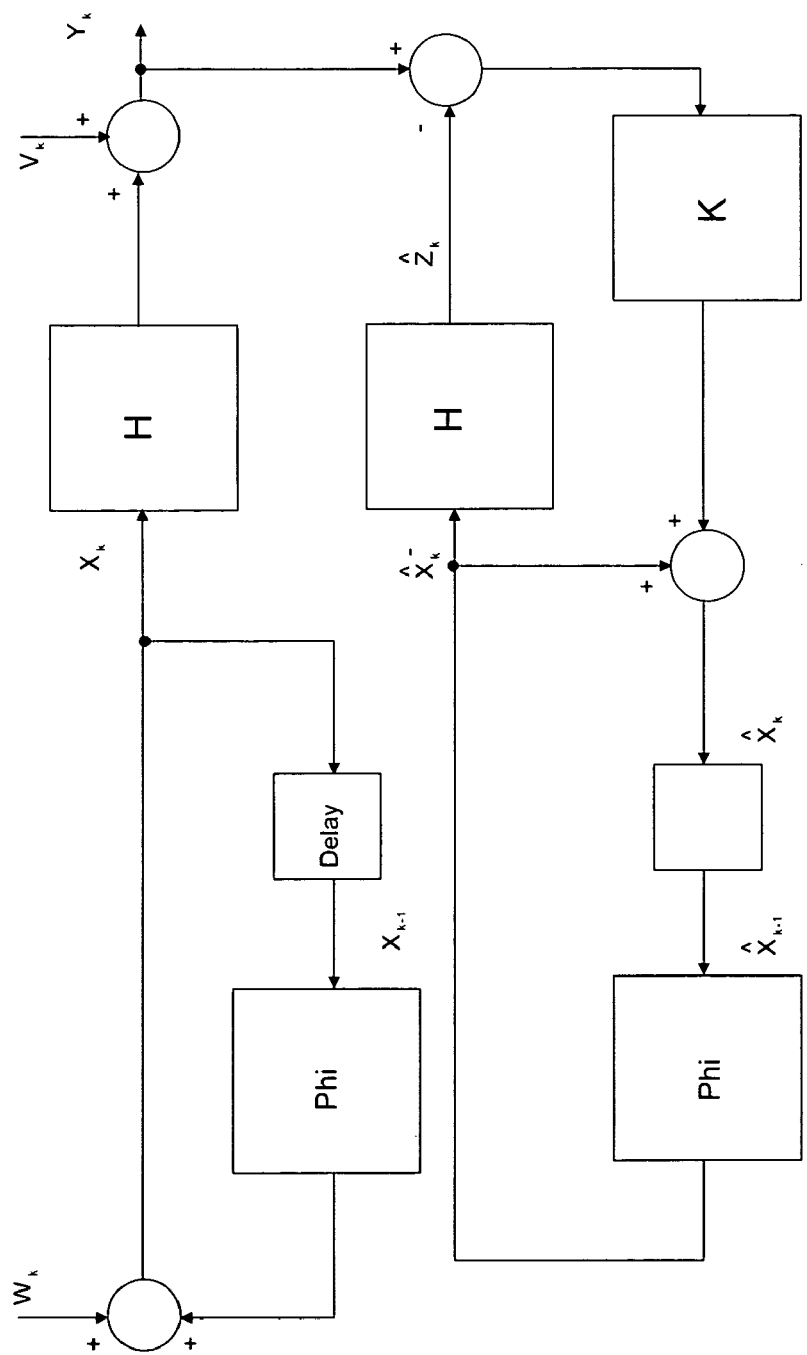
FIG. 14 depicts the algorithmic structure of the Kalman filter.

Kalman Filter Basic Equations. The Kalman filter is an optimal recursive data processing algorithm which combines all available measurement data, plus prior knowledge of system states, to produce an estimate of the desired variables/metrics. FIG. 14 depicts the basic algorithmic structure of the Kalman filter. Mathematically, the structure of FIG. 14 can be rendered as:

$$x_k = \Phi x_{k-1} + w_k$$

$$y_k = H_k x_k + v_k$$

$$K_k = P H_k^T (H_k P H_k^T + R_k)^{-1}$$

$$x^{new} = K_k^* (y_k - \hat{z}_k)$$

where:
  K=Kalman gain
  H=observation mapping matrix

R=measurement error covariance matrix
P=a priori estimate error covariance matrix
y=observed values
$x^{new}$=new estimate value
Φ=state transition operator A simplified version of the Kalman filter, which predominately utilizes the Kalman gain equation (K), is used as the basic mathematical structure for facilitating the metric based frame evaluation/selection process of the data-fusion estimation-algorithm.

Metric Based Estimation Criteria. The estimation process is predicated on the examination of specific metrics associated with each frame of arriving data. As described in the preceding sections of this document, the phase-domain is the preferred state-space model for the recursive estimation and subsequent recovery of noise corrupted QPSK modulated message packets. The estimation process is based on the computation and evaluation of "confidence" ratings which are derived using probability density function assessments of frame based metrics. For purposes of teaching the preferred embodiment of the estimator-algorithm, a frame evaluation metric which is based on a comparison of symbol-vector cluster "tightness" across all the sensor channels of the receive element group will be utilized. Note that this frame evaluation metric is based on a phase-domain mapped state-variable. It should be apparent to anyone skilled in the art that other modulation based state-variables could be used.

The metric evaluation process is facilitated by referencing each phase-domain mapped symbol-vector to a computed centroid fiduciary derived for each quadrant of the phase diagram. Note that the centroid calculations are done for all sensor channels.

In the simplest embodiment of the centroid referencing technique, the estimation metric can be derived from the phase angle difference between a cluster's centroid and each new symbol-vector as follows:

$$\theta_{diff}=|\theta_{centroid}-\theta_{new}|$$

During the run-time operation of the estimation-algorithm, each arriving symbol value for each sensor channel is assigned to a symbol cluster (refer to the "Cluster Assignment" section of this document for details) and a $\theta_{diff}$ is computed for each channel. A symbol-vector whose angular distance from its channel cluster centroid is less than that of a competing channel's symbol-vector distance from its associated cluster centroid (for a specific frame of data) is given greater weight in the frame selection decision process.

As a message packet arrives, $\theta_{diff}$ is recursively computed, using the frames contained in the multi-sensor observation matrix, in order to help make a determination about which frame will be selected for inclusion in the virtual message buffer. Once an entire message has been assembled, it is tested using the error detection mechanism built into the message packet.

Modified Kalman Filter Structure. As mentioned previously, a simplified version of the Kalman filter is employed as the preferred embodiment of the data-fusion receiver estimation-algorithm. This modified Kalman structure predominately utilizes the Kalman gain equation:

$$K_k=PH_k^T(H_k PH_k^T+R_k)^{-1}$$

The a priori estimate error covariance matrix (P) is not utilized in the simplest embodiment of the technique and is thus set to unity. The usage of the observation mapping matrix (H) and measurement error covariance matrix (R) are described in the following paragraphs.

Observation Mapping Matrix. The observation mapping matrix (H) is used to algorithmically "weight" the various frames contained within the multi-sensor observation matrix. This "mapping" process assigns the "confidence" rating to each state/frame of the multi-sensor observation matrix and thus ultimately determines the content of the virtual-message symbol buffer for each iteration of the estimation process. The observation mapping matrix represents the mappings from the current state (i.e. most recent frame symbol-vector) to the observation (i.e. frame symbol-vector value selected for inclusion in the virtual-message symbol buffer). The observation mapping matrix is responsible for magnifying (i.e. assigning a higher "confidence" rating) only the relevant (i.e. least noisy) sensor element channel of the multi-sensor observation matrix. A Kalman filter state in which $H_i$ (where i represents a specific sensor channel number within the receive element group) is greater than all other $H_{k \neq i}$ means that channel i will be weighted most heavily when selecting the least noise effected frame symbol value from among all the possible frame values received from all the sensor channels of the receive element group for a specific estimator state.

Due to the strong destructive noise interference generated on and around the rig, the likelihood that at any given time a plurality of receive-element channels will be heavily noise impacted is significant. The observation mapping matrix therefore greatly biases only the most favored channels (i.e. least noisy channels), while minimizing the weightings of all other channels.

During the operation of the estimation-algorithm, the values for the observation mapping matrix change from state to state. For example, at a given frame $F_k$, H may be weighted as:

(0.02,0)
(0.02,0)
(0.02,0)
(1.00,0)
(0.02,0)
(0.02,0)

While the next frame $F_{k+1}$, the weights may change to, (0.02,0)
(0.02,0)
(1.00,0)
(0.02,0)
(0.02,0)
(0.02,0)

This would represent a change in bias from sensor channel four to sensor channel three in the multi-sensor observation set, and consequently the estimation-algorithm would rely most heavily on channel three to tabulate the expected symbol-vector value for $F_{k+1}$.

In the simplest embodiment of the estimation-algorithm, the values for the observation mapping matrix are generated using the phase-domain mapped centroid-based angular error technique described previously, where:

$$H_k=(1.00,0) \; \{\forall_j | \theta_{diff}(k)<=\theta_{diff}(j)\}$$

$$H_{j \neq k}=(0.02,0)$$

Measurement Error Covariance Matrix. The measurement error covariance matrix (R) is used to quantify the "confidence" rating metric for each frame of arriving data. Like the observation mapping matrix H, the measurement error covariance is derived and adjusted based upon the previously described phase-domain mapped centroid-based angular error technique.

During run-time the angular error for each frame of each channel of the multi-sensor observation matrix is computed and an i by i error covariance matrix R is constructed where the value of each channel i is generated by the formula, $$R_{i=j} = (\theta_{diff}(i)/(\theta_{diff}(i)_{lowest} * \theta_{diff}(i)_{av}), 0)$$

$$R_{i \neq j} = (0,0)$$

where:

$\theta_{diff}(i)$=cluster error estimate for channel i $\theta_{diff}(i)_{lowest}$=cluster error estimate for least noise impacted channel $\theta_{diff}(i)_{av}$=cluster error estimate average for all channels Note that an i by i matrix structure is required for R in order to satisfy the dimensional form requirements of the matrix multiplication associated with the computation of the Kalman gain equation. Also note that the value of i indicates a specific sensor channel number and that the values associated with each channel are stored in the rows of R. For example, the R value for channel 1 would be stored in row 1 of R, the R value for channel 2 would be stored in row 2 of R, etc.

The measurement error covariance calculation is used, in conjunction with the observation mapping matrix, to guarantee that the sensor channel containing the symbol-vector whose angular position is closest to a centroid center receives the lowest weighting value within the estimation-algorithm selection process and thus is most likely to be selected for inclusion within the virtual message buffer.

For example, the i by i measurement error covariance matrix represented as:

| (0.63, 0) | (0, 0) | (0, 0) | (0, 0) | (0, 0) | (0, 0) |
|---|---|---|---|---|---|
| (0, 0) | (2.06, 0) | (0, 0) | (0, 0) | (0, 0) | (0, 0) |
| (0, 0) | (0, 0) | (2.01, 0) | (0, 0) | (0, 0) | (0, 0) |
| (0, 0) | (0, 0) | (0, 0) | (2.09, 0) | (0, 0) | (0, 0) |
| (0, 0) | (0, 0) | (0, 0) | (0, 0) | (2.26, 0) | (0, 0) |
| (0, 0) | (0, 0) | (0, 0) | (0, 0) | (0, 0) | (2.01, 0) | indicates that channel one (i.e. the 0.63 value contained in row 1) has the lowest error covariance of all the sampled channels, and is therefore closest to the channel centroid and thus has the most desirable "tightness" metric.

Estimation-algorithm Run-time Operation. The estimation-algorithm operates by examining specific characteristics, or metrics, associated with each frame of data arriving simultaneously at each surface receive element. The estimation-algorithm is designed to examine each arriving frame, acquired by each receive element, to determine which receive element has the highest probability of accurately representing the symbol for that state.

The specific series of steps which are performed each time a new frame of data arrives is as follows:

1. Cluster Assignment—A new cluster grouping is assigned for each quadrant of the phase diagram for each sensor channel. This grouping is determined using the previous frames stored in the multi-sensor observation matrix.
2. Centroid Calculation—A centroid is computed for each cluster for each sensor channel.
3. Symbol Assignment—The raw symbol value from the arriving frame is assigned to one of the new clusters for each sensor channel.
4. Metric Assessment—A "tightness" metric is computed (utilizing the measurement error covariance matrix portion of the Kalman gain equation) for the arriving frame, and each of the previous frames stored in the multi-sensor observation matrix, for each sensor channel.
5. Frame Selection—The highest "confidence" frame is selected (utilizing the observation mapping matrix portion of the Kalman gain equation) from the arriving frames, and each of the previous frames stored in the multi-sensor observation matrix, and the highest "confidence" frame is stored in the virtual message buffer.

This series of steps is repeated until a preset number of frames/states have been processed. It is important to note that the estimation process is recursive; that is; all previous frames are re-examined during each new state of the estimation-algorithm. This makes the estimation-algorithm very robust since it uses new information to re-evaluate previous "confidence" decisions.

Once the entire message has been received; that is, once the virtual-message symbol buffer has reached the anticipated size, the message is tested using the error detection mechanism built into the message packet. The preferred error detection mechanism is a 16-bit CRC. If the CRC is found to be valid, the message is deemed correct and the data is extracted. If the message cannot be validated using the CRC, the relative cluster assignments are recomputed and the entire multi-sensor observation matrix is re-processed until the message validates or a predetermined confidence threshold is reached whereby the contents of the multi-sensor observation matrix are discarded.

Cluster Assignment. The following description outlines the preferred embodiment of the methodology used for determining the clustering of vector based representations of communication signals. It should be apparent to anyone skilled in the art that alternative vector based clustering methodologies can be used to assess symbol values. These clustering methods would include:

K-means
Hierarchical Agglomerative Clustering
Self Organizing Maps (SOM)
Hidden Markov Models (HMM)
Template Matching In the earlier idealized phase diagrams (FIG. 11), it can be observed that each of the symbol-vectors that lie within a certain quadrant of the phase diagram receive the same binary symbol (2-bit) classification. For the following discussion, all of the symbol-vectors within a respective binary symbol classification region are referred to as clusters. Therefore, in a QPSK modulation scheme, a symbol-vector will be assigned into one of four possible clusters.

Under ideal circumstances, these clusters will consist of tightly bunched symbols that consist of symbol vectors with similar amplitudes and phase angles. However, as demonstrated previously, the impact of noise makes the location and size of these clusters vary widely.

Histogram Bin Assignment. The preferred methodology for assigning clusters to the symbol vectors contained in the multi-sensor observation matrix is the usage of a histogram bin assignment technique. A histogram bin is defined as a particular angular region of a phase diagram. In its most simplistic form, a phase diagram that consists of only a single bin would occupy all of the phase angles between 0° and 360°. As the number of bins increases, the angular domain is divided into equally spaced segments, each reflecting all of the possible symbol-vector values that belong to a particular bin. For example, a four bin phase diagram could contain the following possible angular bin values:

Bin 0: (0°, 90°); Bin 1: (90°, 180°); Bin 2: (180°, 270°); Bin 3: (270°, 360°)

As the number of bins increases, the relative size of each of the bins decreases and the granularity of the histogram becomes finer.

Each symbol-vector is assigned into a particular bin based upon the angle of its location. For all the symbol-vectors that reside within the area (−90°, 90°), the phase angles are determined using the following equation:

$$arctan(x/y) = \theta$$

where x, and y are the rectangular coordinate values of each of the symbol-vectors taken from the phase diagram.

The bin assignment for a data point is therefore the bin whose angular endpoints encompass the given value of θ. In our four bin example above, a symbol-vector that had a phase angle of 3° would be added to Bin 0.

Applying the histogram bin assignment methodology to the frames of data in an arbitrarily defined arriving message yields a twelve-bin histogram that might look like the following:

| Bin 0 | Bin 1 | Bin 2 | Bin 3 | Bin 4 | Bin 5 | Bin 6 | Bin 7 | Bin 8 | Bin 9 | Bin 10 | Bin 11 |
|---|---|---|---|---|---|---|---|---|---|---|---|
| 2 | 1 | 2 | 2 | 4 | 0 | 3 | 10 | 6 | 1 | 3 | 0 |

From the chart above, it is clear that the highest concentration of symbol-vectors reside in Bin 7, so Bin 7 then becomes the primary key bin for the clustering assignments. Since QPSK modulation schemes involve partitioning the symbol-vectors into four distinct groups, the clusters are grouped in the following manner:

Group 0: Bin 6, Bin 7, Bin 8
Group 1: Bin 9, Bin 10, Bin 11
Group 2: Bin 0, Bin 1, Bin 2
Group 3: Bin 3, Bin 4, Bin 5

All of the symbol-vectors that were assigned to Bin 6, Bin 7, or Bin 8 now belong to the same cluster. Similarly all of the other bins are assigned to their respective clusters. In the example above, Bin 7 received the largest number of symbol-vector data points, therefore Bin 7 assumes the role of a central bin for that cluster, and the adjacent bins (6 and 8) join Bin 7 in that cluster assignment. Since the total number of bins is known, and the center of one of the clusters has been identified, the rest of the bins are clustered according to the formula:

$$\text{Cluster Assignment}(x) = \lfloor(((x+n_b-(p-\lfloor(n_b/n_c/2)))) \% n_b)/(n_b/n_c)\rfloor$$

Where: $n_b$=total number of bins
$n_c$=total number of clusters
x=current bin being assigned ($0 \le x < n_b$)
p=primary key bin
$\lfloor$=round down to nearest integer
%=modulo operator The above cluster assignment formula ensures that the primary key bin will be located in the center of the cluster group 0, and that all other cluster centers will be spaced equally around the phase-domain.

The histogram-based technique above is extremely fast. In Big O notation, the algorithm achieves O(n), or time linearity with respect to the number of data points. Obviously this type of clustering is easily applicable to other applications and modulation schemes.

Cluster Rotation. Histogram based clustering presents a technical challenge with respect to how each cluster is labeled. Using a normal QPSK phase diagram, all the symbol-vectors that fall within a certain region are assigned a specific binary decoding. An archetypical QPSK example is one where the boundary between binary assignment regions falls at 45°, 135°, 225°, and 315° as depicted in FIG. 3. Data points that fall in these predetermined regions are assigned the following binary values:

(315, 45)→00,
(45,135)→01,
(135,225)→10,
(225, 315)→11

Figure 15:
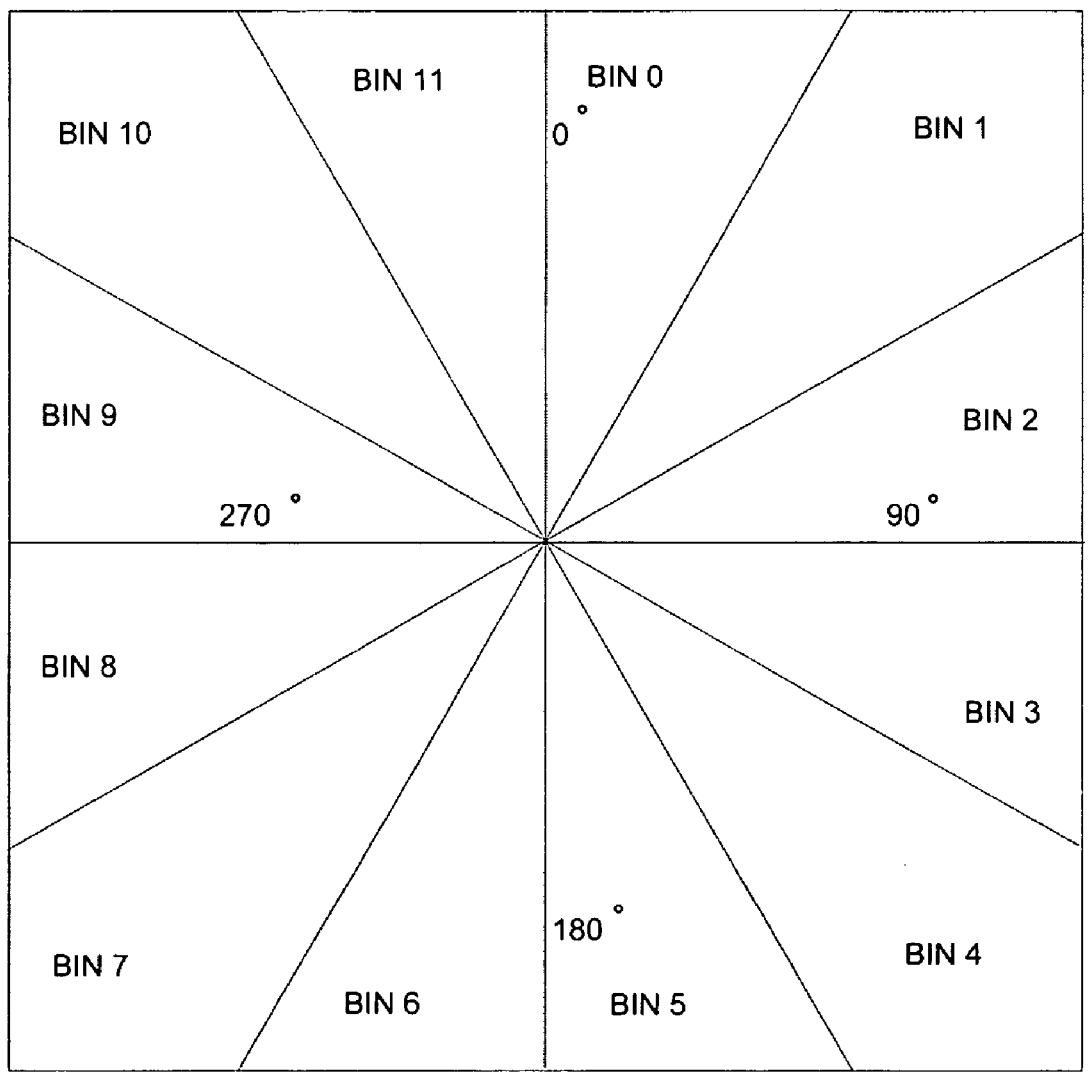
FIG. 15 depicts a typical histogram bin assignment.

However, when a clustering approach is used which does not use fixed binary assignment boundaries, a new method is required for assigning each decoded symbol-vector a new binary value. Using the twelve bin example above, we assume that Bin 0 starts at 0° continuing in a clockwise fashion to 30°, Bin 1 starts at 30° and continues to 60°, and so forth as depicted in FIG. 15. The twelve cluster groupings above indicate that the new binary assignment regions will now become:

(0, 90)→A,
(90,180)→B,
(180,270)→C,
(270, 360)→D

Where: A, B, C, D each represent one of the possible binary assignment values.

This presents one of the key problems with data point clustering techniques: how to assign cluster labels once all of the data points that constitute a given cluster are assigned. When tackling this problem, it is useful to consider one of the fundamental problems associated with acquiring electromagnetic field data and that is the likelihood of a signal inversion within the data itself. Fortunately both of these problems can be addressed simultaneously by enumerating all the possible binary data values, while taking into account the relative position of one cluster to the others.

The following example contains a small subset of the message contained in the example previously given in FIG. 10. Frames 27 through 34 are shown which represent the error detection portion of the message in FIG. 10. The original frame representations are listed as the binary assignment value for alternate cluster assignment I. Alternate cluster assignments II-IV are derived according to the following formula:

$$\text{Alternate binary assignment for } ac_i = (ac_i - 1 + b_k) \% n_c$$

Where:
$ac_i$=alternate cluster assignment number (II<=$ac_i$<=IV)

$n_c$=total number of clusters
$b_k$=binary assignment value for primary key bin
%=modulo For example, Frame 27 has the value $10_2$, in order enumerate all of the other possible values for Frame 27, we apply the formula above to generate the values for each of the alternate cluster assignments:

Alternate cluster assignment I: $10_2$
Alternate cluster assignment II: $(2_{10}-1_{10}+10_2) \% 4=11_2$
Alternate cluster assignment III: $(3_{10}-1_{10}+10_2) \% 4=00_2$
Alternate cluster assignment IV: $(4_{10}-1_{10}+10_2) \% 4=01_2$ The chart below provides a more intuitive understanding of the application of the above formula:

|  | F27 | F28 | F29 | F30 | F31 | F32 | F33 | F34 |
|---|---|---|---|---|---|---|---|---|
| Alternate cluster assignment I: | [10] | [11] | [00] | [00] | [00] | [11] | [10] | [01] |
| Alternate cluster assignment II: | [11] | [00] | [01] | [01] | [01] | [00] | [11] | [10] |
| Alternate cluster assignment III: | [00] | [01] | [10] | [10] | [10] | [01] | [00] | [11] |
| Alternate cluster assignment IV: | [01] | [10] | [11] | [11] | [11] | [10] | [01] | [00] |

From the application of the formula above, we can see that the binary assignment of each cluster will maintain its value relative to its neighboring clusters. In other words, the cluster located adjacently in the clockwise direction will always have a binary value (modulo 4) that is one greater, and the cluster located adjacently in the counter clockwise direction will always have a binary value (modulo 4) that is one less.

As can be seen from the above cluster assignment mutations, signal inversions are now handled through alternate cluster assignments. For example, if the original signal were inverted, the received binary decoding pattern would look like the following:

|  | Frame |  |  |  |  |  |  |  |
|---|---|---|---|---|---|---|---|---|
|  | F27 | F28 | F29 | F30 | F31 | F32 | F33 | F34 |
| Alternate cluster assignment I: | [00] | [01] | [10] | [10] | [10] | [01] | [00] | [11] |
| Alternate cluster assignment II: | [01] | [10] | [11] | [11] | [11] | [10] | [01] | [00] |
| Alternate cluster assignment III: | [10] | [11] | [00] | [00] | [00] | [11] | [10] | [01] |
| Alternate cluster assignment IV: | [11] | [00] | [01] | [01] | [01] | [00] | [11] | [10] |

In this case, alternate cluster assignment I is clearly incorrect, however the signal inversion has simply rotated all of the binary decoding patterns by one hundred and eighty degrees resulting in the correct message being located in alternate cluster assignment III. The presence of a 16-bit CRC enables the incorrect alternate cluster assignments to be filtered out, leaving only the correct binary representation of the message.

Centroid Calculation. Following cluster assignments, the centroid for each cluster can be calculated using the phase-domain state-space mapping for each of the symbol-vector locations in the cluster according to the formula, $$\text{Centroid for cluster } j = \frac{1}{k} * \sum_{0}^{k-1} \theta_k$$

Where: $\theta_k$=Phase angle for symbol-vector k, located in cluster j
k=Number of symbol-vectors in cluster The calculation of the endpoint locations is important to the correct determination of the cluster centroid. For example, suppose the cluster had symbol-vectors located at 350°, 355°, and 0°. Using a phase domain mapping, these vector locations appear very close to each other. However when the above formula is applied, the answer is incorrect. In this case it becomes necessary to scale all the symbol vector locations so that they fall within the same 90° cluster region. Therefore the values would be converted to 350°, 355°, and 360°, and the above formula is applied. If the result of the operation is a centroid value that is greater than 360°, then the centroid value is mapped back into the (0°,360°) phase domain by subtracting off 360°.

Persons of ordinary skill in the art will understand how to carry out the computations, calculations, and algorithms disclosed herein on a one or more computer processors using one or more computer software applications or modules.

We claim:

1. A method utilizing a computer processor for performing computations and for recovering a decodable message from a noise-corrupted subterranean electromagnetic telemetry message string, the method comprising:

simultaneously operating a plurality of spatially distributed electromagnetic field sensors to sense the telemetry message string, each field sensor having one or more channels to detect electromagnetic field characteristics;

receiving information signals from each channel of the plurality of field sensors, each information signal being representative of a sensed electromagnetic field characteristic at a point in time;

recording said information signals in a manner facilitating identification of temporally corresponding information signals from the plurality of field sensors;

identifying minimally noise corrupted information signals from among all temporally-corresponding information signals; and assembling a virtual message utilizing the minimally noise corrupted information signals.

2. The method of claim 1, wherein at least one of the electromagnetic field sensors is an electric field sensor and at least one of the electromagnetic field sensors is a magnetic field sensor.

3. The method of claim 1, wherein the telemetry message string comprises a data payload and an error detection mechanism, the method further comprising performing a validation check of the virtual message using the error detection mechanism.

4. The method of claim 1, wherein the telemetry message string is digitally encoded on an ultra-low frequency electromagnetic wave in accordance with a digital modulation scheme having at least two possible data states.

5. The method of claim 4, wherein the digital modulation scheme is a symbol based modulation scheme.

6. The method of claim 4, wherein the digital modulation scheme is a quadrature phase shift keyed phase modulation scheme.

7. The method of claim 4, further comprising:
assigning each information signal received from a sensor channel to one of a plurality of clusters, wherein a cluster comprises a plurality of information signals previously received from a common sensor channel, and wherein each cluster represents one of the possible data states of the digital modulation scheme;
computing the centroid of each cluster; and
identifying, for each set of temporally corresponding information signals, the information signal deviating the least from the centroid of the cluster to which it is assigned, wherein the step of identifying minimally noise corrupted information signals is functionally dependent upon the identification of least-deviating information signals.

8. The method of claim 7, further comprising recursively repeating the cluster assignment, centroid computation, and virtual message assembly steps for previously assigned information signals as successive information signals are received until the virtual message has reached a preset message-size limit.

9. The method of claim 7, further comprising:
computing a measurement error probability statistical moment for each channel, wherein the step of identifying minimally noise corrupted information signals is also functionally dependent upon the computed measurement error probability statistical moment for each channel.

10. The method of claim 7, further comprising:
computing the measurement error covariance of each channel, wherein the step of identifying minimally noise corrupted information signals is also functionally dependent upon the computed measurement error covariance of each channel.

11. The method of claim 9, further comprising recursively repeating the cluster assignment, centroid computation, measurement error probability statistical moment computation, and virtual message assembly steps for previously assigned information signals as successive information signals are received until the virtual message has reached a preset message-size limit.

12. The method of claim 11, wherein the telemetry message string comprises a data payload and an error detection mechanism, whereby using said error detection mechanism, a validation check of the virtual message is performed.

13. An apparatus for recovering a decodable message from a noise-corrupted subterranean electromagnetic telemetry message string, the apparatus comprising:

a plurality of spatially distributed electromagnetic field sensors operable to simultaneously sense the telemetry message string, each field sensor having one or more channels to detect electromagnetic field characteristics;
a computer in communication with said field sensors and operable to record information signals from each channel of the plurality of field sensors in a manner facilitating identification of temporally-corresponding information signals, wherein each information signal is representative of a sensed electromagnetic field characteristic at a point in time; and
a computer software module that identifies minimally noise corrupted information signals from among all temporally-corresponding information signals and assembles a virtual message utilizing the minimally noise corrupted information signals.

14. The apparatus of claim 13, wherein at least one of the electromagnetic field sensors is an electric field sensor and at least one of the electromagnetic field sensors is a magnetic field sensor.

15. The apparatus of claim 13, wherein the telemetry message string comprises a data payload and an error detection mechanism, the computer software module being operable to perform a validation check of the virtual message using the error detection mechanism.

16. The apparatus of claim 13, wherein the telemetry message string is digitally encoded on an ultra-low frequency electromagnetic wave in accordance with a digital modulation scheme having at least two possible data states.

17. The apparatus of claim 16, wherein the digital modulation scheme is a quadrature phase shift keyed phase modulation scheme.

18. The apparatus of claim 16, wherein the computer software module is operable to:
assign each information signal received from a sensor channel to one of a plurality of clusters, wherein a cluster comprises a plurality of information signals previously received from a common sensor channel, and wherein each cluster represents one of the possible data states of the digital modulation scheme;
compute the centroid of each cluster; and
identify, for each set of temporally corresponding information signals, the information signal deviating the least from the centroid of the cluster to which it is assigned.

19. The apparatus of claim 18, wherein the computer software module is operable to recursively repeat the cluster assignment, centroid computation, and virtual message assembly steps for previously assigned information signals as successive information signals are received until the virtual message has reached a preset message-size limit.

20. The apparatus of claim 18, wherein the computer software module is operable to compute a measurement error probability statistical moment for each channel.

21. The apparatus of claim 20, wherein the computer software module is operable to recursively repeat the cluster assignment, centroid computation, measurement error probability statistical moment computation, and virtual message assembly steps for previously assigned information signals as successive information signals are received until the virtual message has reached a preset message-size limit.

22. The method of claim 21, wherein the telemetry message string comprises a data payload and an error detection mechanism, and wherein the computer software module is operable to perform a validation check of the virtual message using the error detection mechanism.

* * * * *